(12) United States Patent
Morita et al.

(10) Patent No.: US 9,154,055 B2
(45) Date of Patent: Oct. 6, 2015

(54) DRIVE DEVICE

(75) Inventors: Takeshi Morita, Saitama (JP); Ryuichi Yoshida, Sakai (JP)

(73) Assignee: KONICA MINOLTA, INC. (JP)

( * ) Notice: Subject to any disclaimer, the term of this patent is extended or adjusted under 35 U.S.C. 154(b) by 439 days.

(21) Appl. No.: 13/577,040

(22) PCT Filed: Feb. 2, 2011

(86) PCT No.: PCT/JP2011/000560
§ 371 (c)(1),
(2), (4) Date: Aug. 3, 2012

(87) PCT Pub. No.: WO2011/096199
PCT Pub. Date: Aug. 11, 2011

(65) Prior Publication Data
US 2012/0299442 A1    Nov. 29, 2012

(30) Foreign Application Priority Data
Feb. 4, 2010    (JP) ................................ 2010-023394

(51) Int. Cl.
*H01L 41/09* (2006.01)
*H02N 2/02* (2006.01)

(52) U.S. Cl.
CPC ..................................... *H02N 2/025* (2013.01)

(58) Field of Classification Search
USPC ................ 310/317, 323.01–323.19, 328, 369
See application file for complete search history.

(56) References Cited

U.S. PATENT DOCUMENTS

| | | | | |
|---|---|---|---|---|
| 4,728,843 | A | * 3/1988 | Mishiro | ........................ 310/325 |
| 5,225,941 | A | 7/1993 | Saito et al. | |
| 6,483,226 | B1 | * 11/2002 | Okada | ........................ 310/328 |
| 7,078,847 | B2 | * 7/2006 | Miyazawa et al. | ....... 310/323.02 |
| 7,161,277 | B2 | 1/2007 | Yuasa et al. | |

(Continued)

FOREIGN PATENT DOCUMENTS

| JP | 2633066 B2 | 7/1997 |
|---|---|---|
| JP | 2001-119962 A | 4/2001 |
| JP | 3171187 B2 | 5/2001 |
| JP | 2005-318720 A | 11/2005 |
| JP | 2008-26609 A | 2/2008 |

OTHER PUBLICATIONS

International Search Report for International application No. PCT/JP2011/000560 mailing date of Apr. 5, 2011 with English translation.
Ryuichi Yoshida et al., "Development of Smooth Impact Drive Mechanism (2nd Report)—Optimization of waveform of driving voltage—", Journal of the Japan Society for Precision Engineering, vol. 68, No. 4, 2002, p. 536-541.

*Primary Examiner* — Thomas Dougherty
(74) *Attorney, Agent, or Firm* — Cantor Colburn LLP

(57) ABSTRACT

Disclosed is a drive device 1 which is adapted to move a driven member used on a speed difference between during extending and during contracting in a course of vibration of a vibrator. The vibrator, e.g., a piezoelectric element 4, 5, is formed in a structure which has two resonance modes identical in terms of a vibration direction, and allows a ratio between resonance frequencies of the two resonance modes to become approximately 2. A drive signal to be given to the vibrator is configured to approximately conform to the two resonance modes. The drive device 1 having the above configuration makes it possible to generate pseudo-sawtooth displacement vibration multiplied by an amplitude amplification factor Q through resonance, thereby improving a movement speed, and allow a larger part of input energy to be used for mechanical vibration, thereby improving energy efficiency.

13 Claims, 23 Drawing Sheets

(56) References Cited

U.S. PATENT DOCUMENTS

| | | |
|---|---|---|
| 7,941,051 B2 | 5/2011 | Shibatani et al. |
| 2005/0242688 A1 | 11/2005 | Yuasa et al. |
| 2005/0248234 A1* | 11/2005 | Hoshino .................. 310/328 |
| 2007/0040471 A1* | 2/2007 | Ollila ..................... 310/317 |
| 2007/0081805 A1* | 4/2007 | Ollila et al. ............... 396/48 |
| 2008/0019702 A1 | 1/2008 | Shibatani et al. |
| 2008/0252173 A1* | 10/2008 | Yoshida et al. ............ 310/317 |
| 2010/0296184 A1* | 11/2010 | Shibatani .................. 359/824 |

* cited by examiner

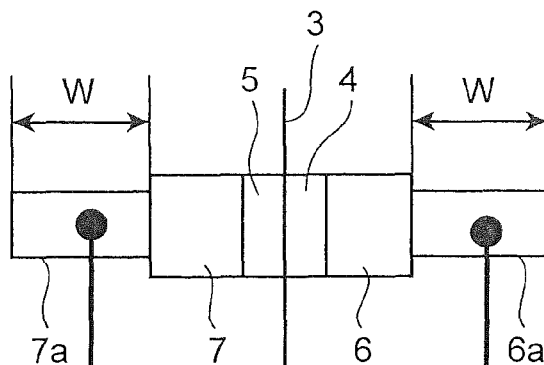
FIG.4A
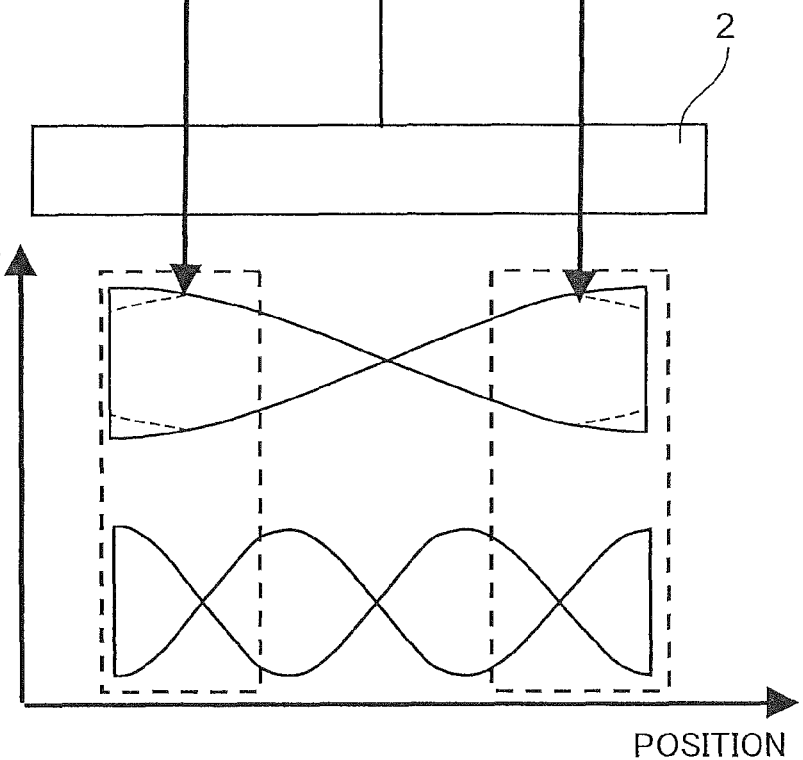
FIG.4B
FIRST-ORDER MODE
FIG.4C
SECOND-ORDER MODE

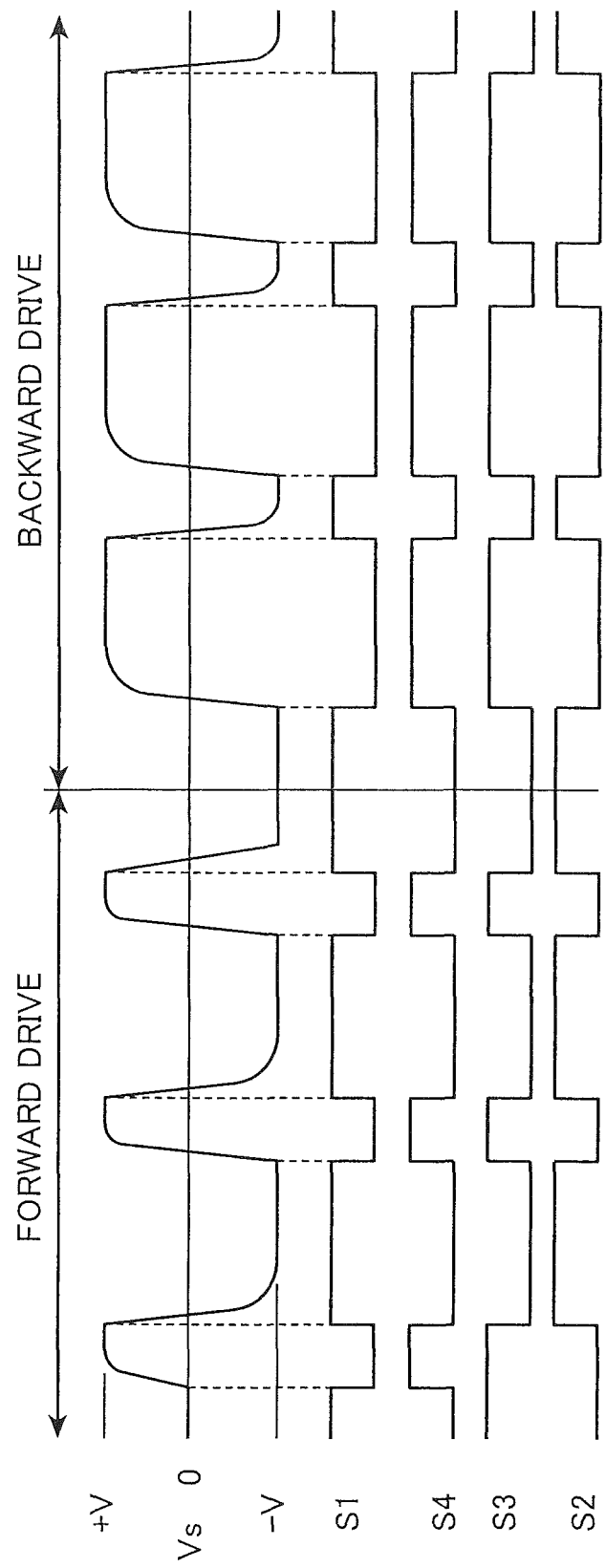

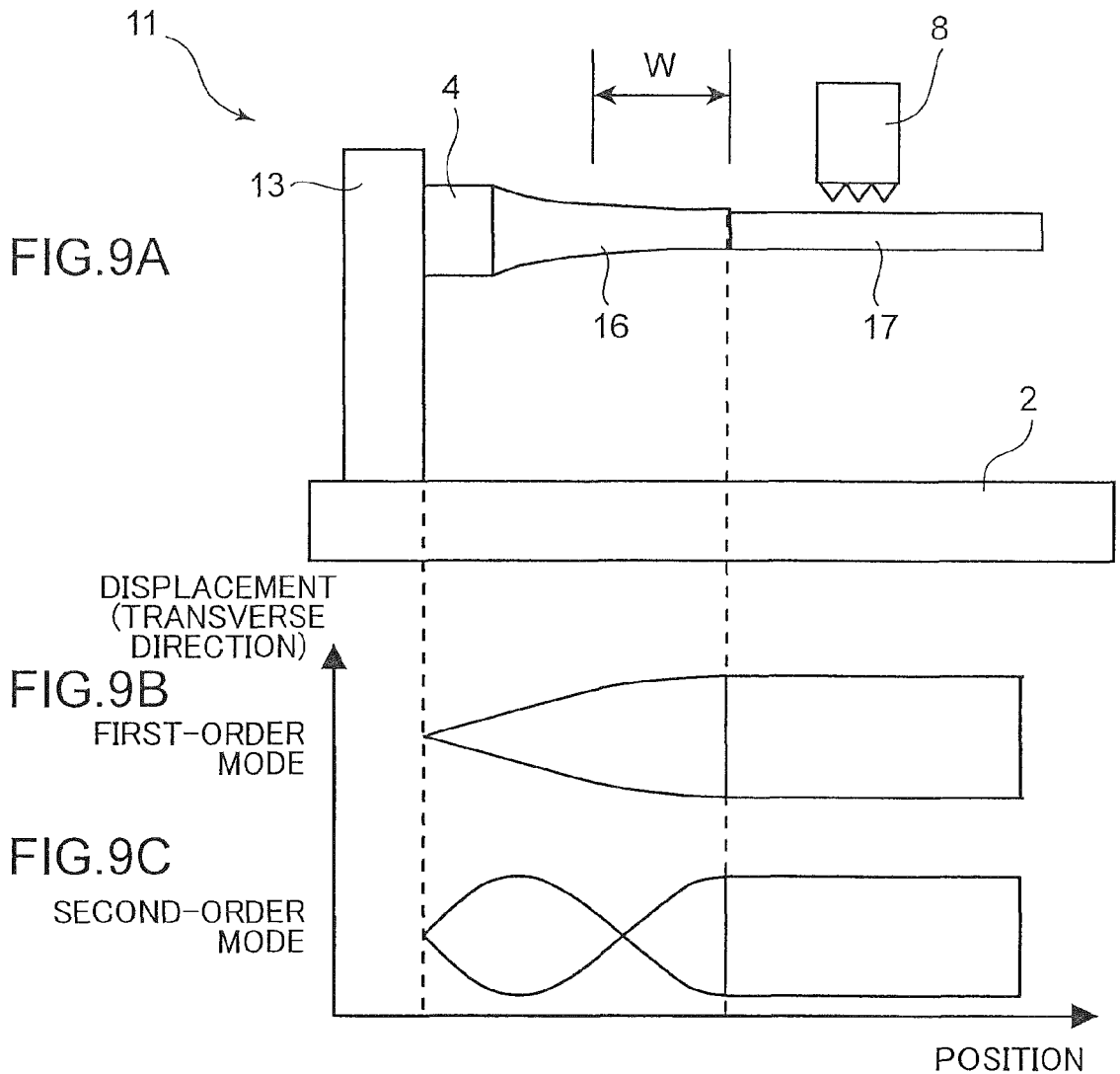

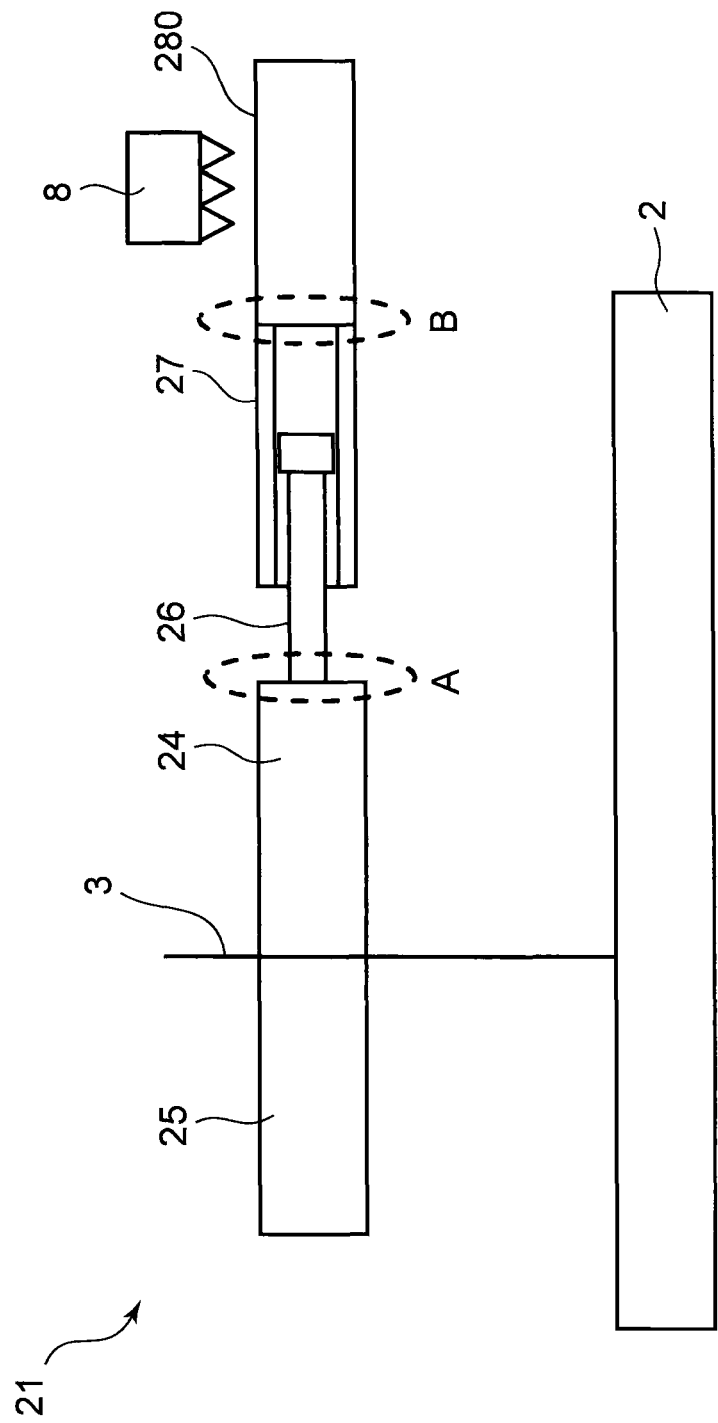

\+

=

FIG.25
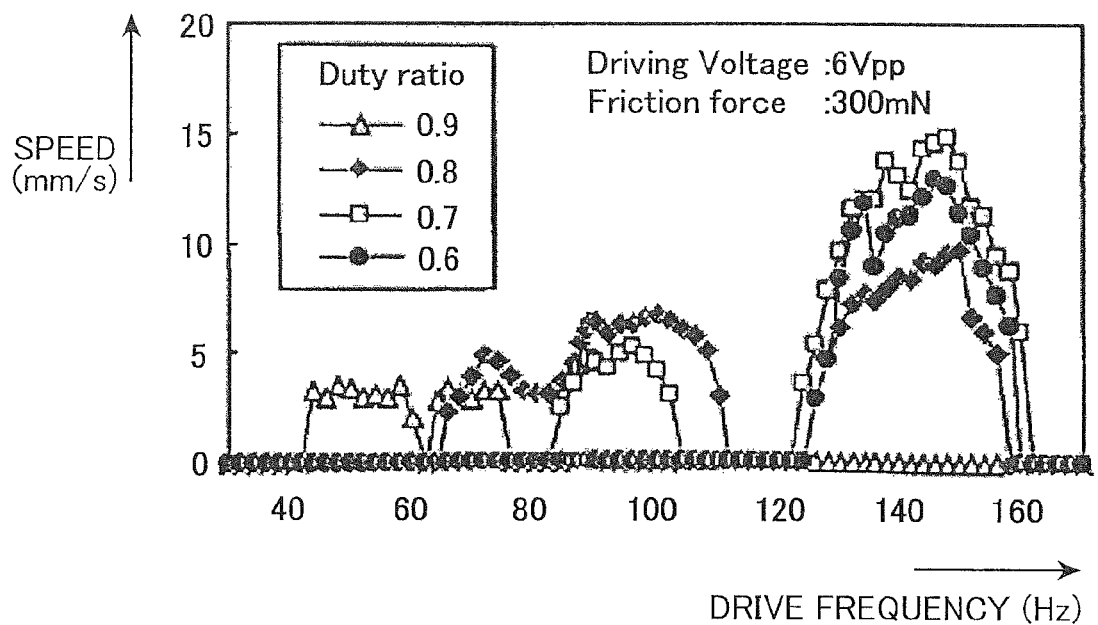
DRIVE FREQUENCY (Hz)
| | DRIVE FREQUENCY | DISPLACEMENT OF PIEZOELECTRIC ELEMENT |
|---|---|---|
| FIG.26A | 0.7 TIMES OF RESONANCE FREQUENCY |  |
| FIG.26B | 1.0 TIME OF RESONANCE FREQUENCY | 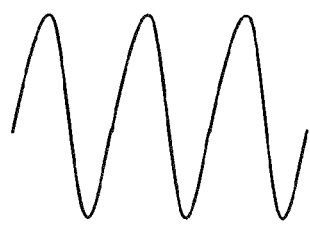 |

Fig. 27

| DISPLACEMENT WAVEFORM (MOVEMENT DIRECTION →) | REQUIRED VOLTAGE WAVEFORM ||
|---|---|---|
| | ONLY FIRST-ORDER +SECOND-ORDER SINUSOIDAL WAVE | USING H-BRIDGE CIRCUIT |
| ∿∿∿ | ∿∿∿ | ⊓⎍⊓_ |
| ∿∿∿ | ⋀⋀⋀ | _⊓_⊓_ |
| ∿∿∿ | ⋁⋁⋁ | ⌐⊓⊓_ |

Fig. 28
| DISPLACEMENT WAVEFORM (MOVEMENT DIRECTION ←) | REQUIRED VOLTAGE WAVEFORM | |
|---|---|---|
| | ONLY FIRST-ORDER +SECOND-ORDER SINUSOIDAL WAVE | USING H-BRIDGE CIRCUIT |
|  |  |  |
|  |  | 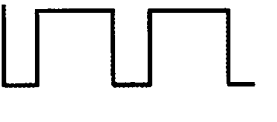 |
|  |  | 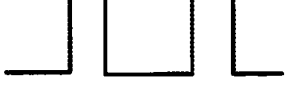 |

DRIVE DEVICE

CROSS REFERENCE TO RELATED APPLICATIONS

This is a U.S. national stage of application No. PCT/JP2011/000560, filed on 2 Feb. 2011. Priority under 35 U.S.C. §119(a) and 35 U.S.C. §365(b) is claimed from Japanese Application No. 2010-023394, filed 4 Feb. 2010, the disclosure of which are also incorporated herein by reference.

TECHNICAL FIELD

The present invention relates to a drive device suitably implementable as an ultrasonic linear actuator using the SIDM (Smooth Impact Drive Mechanism (registered trademark)).

BACKGROUND ART

For example, an ultrasonic linear actuator has a structure schematically illustrated in FIG. 20, wherein it is adapted to transmit extending and contracting of a piezoelectric element to a rod (driving shaft), and move a driven member (movable body) engaged with the rod with a predetermined frictional force, based on a speed difference between during extending and during contracting of the piezoelectric element. For example, when the rod is extended slowly, the driven member frictionally engaged with the rod is moved together therewith, as illustrated in FIGS. 20(A) and 20(B), and then when the rod is contracted instantaneously enough to exceed the predetermined frictional force, the driven member is left at a extend position due to inertia, as illustrated in FIGS. 20(B) and 20(C). Based on repeatedly performing this motion, the ultrasonic linear actuator is operable to move the driven member in an axial direction of the rod. The ultrasonic linear actuator is also adapted to perform the extending instantaneously and then perform the contracting slowly, thereby allowing a direction of movement of the driven member to be reversed with respect to that as described above.

This type of ultrasonic linear actuator is structurally simple as compared to conventional Lorentz force-type motors and others, and capable of directly driving a load without using a speed reducing mechanism. Thus, as an example of its application, the following Parent Document 1 proposes a drive device configured such that the rod is set up in a direction of an optical axis of a lens, and a holding member of a focusing lens is engaged with the rod, thereby realizing autofocusing. In order to allow the driven member to be frictionally engaged with the rod, a magnetic force may be used, as well as a pressing force based on a spring or the like.

However, the above ultrasonic linear actuator has problems of low speed performance and poor efficiency as compared to other types of ultrasonic motors similarly using a piezoelectric element, such as standing wave-type and traveling wave-type ultrasonic motors. The difference is because, in other types of ultrasonic motors, the piezoelectric element is driven in a resonance region. When the piezoelectric element is driven in the resonance region, it becomes possible to increase a displacement (stroke) even using a low-voltage signal, and efficiently improve the speed performance. On the other hand, in the above ultrasonic linear actuator, a frequency of a drive signal is approximately 0.7 times as high as a resonance frequency as described later, so that the displacement (stroke) is as small as several μm at a maximum. Further, in the case of utilizing resonance, input energy is mostly used for mechanical vibration, whereas, in the case of utilizing no resonance, the energy is used for charge and discharge of an electrical capacitor made with a dielectric and constituting the piezoelectric element, which leads to poor efficiency.

FIG. 21 illustrates a relationship between respective displacements of the piezoelectric element and the driven member over time, in the ultrasonic linear actuator. As mentioned above, the driven member is moved based on the speed difference between during stretching and during shrinking of the piezoelectric element. For this purpose, a pseudo-sawtooth drive signal as illustrated in FIG. 22 is given from a drive circuit to the piezoelectric element. Then, displacements corresponding to respective oblique line sections in a sawtooth waveform of the drive signal are added up as a total displacement amount of the driven member, as illustrated in FIG. 21.

In the following Patent Document 2, the applicant of this application previously disclosed that a sawtooth displacement can be obtained by appropriately selecting a drive frequency even if a rectangular-wave voltage as illustrated in FIG. 23 is given. Further, a theoretical background thereof is disclosed in the following Non-Patent Document 1. The theory may be summarized as follows. A basic of a sawtooth waveform as illustrated in FIG. 24(C) can be obtained by adding, to a sinusoidal signal having a fundamental frequency as illustrated in FIG. 24(B), a second harmonic sinusoidal signal as illustrated in FIG. 24(A). In other words, the sawtooth waveform includes, as components, a plurality of sinusoidal waves having different frequencies. In this case, as long as there are at least first-order and second-order components among them, the signal becomes a sufficient level to drive the ultrasonic linear actuator. The displacement y can be expressed as the following formula (1):

$$y = -\sin(\omega t) - 0.25 \cdot \sin(2\omega t) \tag{1}$$

As conditions for obtaining such a sawtooth waveform, in cases where the drive frequency is low, it is necessary to form a drive signal into the sawtooth waveform exactly. However, when the drive frequency is increased to a certain extent, it becomes possible to produce a sawtooth displacement by inputting, into the piezoelectric element, the aforementioned rectangular wave having a frequency which is approximately 0.7 times as high as the resonance frequency. In the Patent Document 2, this characteristic is utilized to allow the actuator to be driven by a rectangular-wave voltage which is easily implementable in a product.

FIG. 25 illustrates a change in a movement speed of the driven member when a duty ratio and a frequency of the rectangular wave are changed. This graph is illustrated as FIG. 20 in the Non-Patent Document 1, wherein the resonance frequency of the piezoelectric element and the rod and the drive voltage of the piezoelectric element are set to 200 kHz and 6 Vp-p, respectively, and a frictional force of the driven member with respect to the rod is set to 300 mN. As is clear from FIG. 25, when the frequency of the rectangular wave is approximately 0.7 times as high as the resonance frequency, respective phases and gains of a sinusoidal wave as a first-order component and a sinusoidal wave as a second-order component each included in the rectangular wave have an adequate relationship, so that a sawtooth displacement is obtained, and the highest speed is obtained.

However, if the drive frequency is set to become coincident with the resonance frequency as in other types of ultrasonic motors, only the gain of the sinusoidal wave as a first-order component wave included in the rectangular wave is amplified as illustrated in FIG. 26(B), and, in contrast, the gain of the sinusoidal wave as a second-order component is reduced, so that an adequate sawtooth displacement as illustrated in FIG. 26(A) is not obtained. This means that it is impossible to drive the above ultrasonic linear actuator.

The ultrasonic linear actuator is structurally simple, and capable of directly driving a load without using a speed reducing mechanism, as mentioned above. Thus, based on higher-power characteristics (improvement in movement speed and energy efficiency), it can be expected to develop application to new products. For example, it can be expected to use the actuator for a new purpose such as artificial muscle of a humanoid robot. Further, it is possible to promote microminiaturization using a piezoelectric thin film, specifically, structurally simplify a Langevin vibrator using a thin film or a non-laminate structure. Thus, it can also be expected to develop application to a micromachine such as an actuator for use in a distal end of an endoscope. On the other hand, in existing products, for example, in image stabilization of a camera, based on the higher-power characteristics, it becomes possible to displaceably drive a larger image sensor at a high speed, and suppress power consumption and heat generation even in a continuous drive mode such as a video recording mode.

LIST OF PRIOR ART DOCUMENTS

Patent Documents

Patent Document 1: JP 2633066
Patent Document 2: JP 3171187

Non-Patent Documents

Non-Patent Document 1: "Development of Smooth Impact Drive Mechanism (SIDM) (Part 2)", Journal of the Japan Society for Precision Engineering, Vol. 68, No. 4 (2002), pp 536-541

SUMMARY OF THE INVENTION

The present invention has been made in view of the above circumstances, and an object thereof is to provide a drive device capable of increasing displacement vibration to improve a movement speed, and improve energy efficiency.

A drive device of the present invention is adapted to move a driven member based on a speed difference between during extending and during contracting in a course of vibration of a vibrator. The vibrator is formed in a structure which has two resonance modes identical in terms of a vibration direction, and allows a ratio between respective resonance frequencies of the two resonance modes to become approximately 2. A drive signal to be given to the vibrator is configured to approximately conform to the two resonance modes. The drive device having the above configuration makes it possible to generate pseudo-sawtooth displacement vibration multiplied by an amplitude amplification factor Q through resonance, thereby improving a movement speed, and allow a larger part of input energy to be used for mechanical vibration, thereby improving energy efficiency.

The above and other objects, features and advantages of the present invention will be apparent from the following detailed description and the accompanying drawings.

BRIEF DESCRIPTION OF THE DRAWINGS

FIGS. 4A-4C are a side view schematically illustrating a state after adjustment of the vibration mode in the ultrasonic linear actuator illustrated in FIG. 1.

FIG. 8 is a waveform chart of a drive signal from the drive circuit illustrated in FIG. 7(A).

FIGS. 9A-9C are a side view schematically illustrating a structure of an ultrasonic linear actuator which is a drive device according to a second embodiment.

FIG. 13 is a sectional view of the ultrasonic linear actuator illustrated in FIG. 12.

FIG. 25 is a graph illustrating a change in a movement speed of a driven member with respect to changes in a duty ratio and a frequency, in cases where the rectangular-wave drive signal illustrated in FIG. 23 is used.

FIGS. 26A-26B are graphs for explaining a problem in the drive signal illustrated in FIG. 22.

FIG. 27 is a chart illustrating displacement waveforms of moving rightward and correspondence voltage waveforms required to the displacement waveforms.

FIG. 28 is a chart illustrating displacement waveforms of moving leftward and correspondence voltage waveforms required to the displacement waveforms.

DESCRIPTION OF EMBODIMENTS

Figure 1:
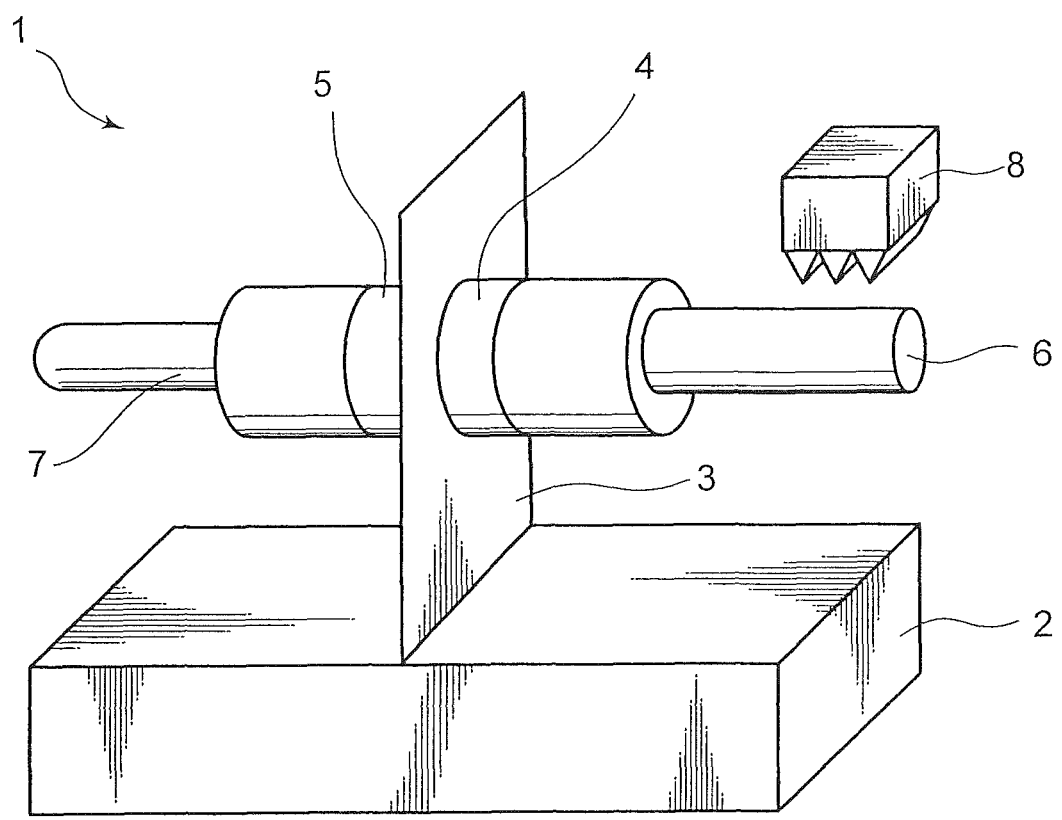
FIG. 1 is a perspective view schematically illustrating a structure of an ultrasonic linear actuator which is a drive device according to a first embodiment.

With reference to the drawings, an embodiment of the present invention will now be described. In the figures, some elements or components are assigned with the same reference numeral or code. This means that they are the same elements or components, and thereby their duplicated description will be omitted on a case-by-case basis. In this embodiment, when a reference numeral or code generically designates each of a set of elements or components, it is described without a suffix, and, when a reference numeral or code designates a specific one of the elements or components, it is described with a suffix.

First Embodiment

FIG. 1 is a perspective view schematically illustrating a structure of an ultrasonic linear actuator 1 which is a drive device according to a first embodiment. This ultrasonic linear actuator 1 comprises a fixed member 2, a support plate 3, a piezoelectric element 4, a piezoelectric element 5, a driving member 6, a driving member 7, and a driven member 8. The ultrasonic linear actuator 1 is roughly configured such that the piezoelectric elements 4, 5 each serving as a first vibrator are attached, respectively, to opposite surfaces of the support plate 3 provided to stand upwardly from the fixed member 2, wherein the driving members 6, 7 are attached, respectively, to distal edge faces of the piezoelectric elements 4, 5, and the driven member 8 is provided with respect to at least one of the driving members 6, 7 (in FIG. 1, only the driving member 6) in a frictionally engageable manner.

The support plate 3 is capable of supporting a weight of the piezoelectric elements 4, 5 and the driving members 6, 7, and formed from a thin plate in order to reduce vibration propagation therethrough. For example, it is made of duralumin, and formed to have a thickness of 0.2 mm. Each of the piezoelectric elements 4, 5 is composed, for example, of a Langevin vibrator adapted to be vibrated in a thickness direction, wherein each of the driving members 6, 7 is fixedly attached to one of opposite edge faces of a respective one of the piezoelectric elements 4, 5 in a direction of the vibration, and the other edge face is attached to one of the opposite surfaces of the support plate 3. As means for joining each of the piezoelectric elements 4, 5 to the support plate 3, adhesive bonding is employed. Alternatively, it may be joined in a similar manner to a bolted Langevin vibrator with higher reliability. In this configuration, when equivalent drive signals are input from a drive circuit into respective ones of the piezoelectric elements as described later, generated vibrations are propagated to respective ones of the driving members 6, 7 without being propagated to the support plate 3 because the vibrations are mutually canceled out on the side of the support plate 3.

Each of the driving members 6, 7 is a rod-shaped member, and the driven member 8 is engaged therewith with a predetermined frictional force. It is necessary for each of the driving members 6, 7 to transmit, through not only a base end but also a distal end thereof, a displacement of a respective one of the piezoelectric elements 4, 5 without lag. In view of this necessity, each of the driving members 6, 7 is made of a material which is a rigid body in actual drive conditions. The frictional force in the driven member 8 may be generated by a pressing force based on a spring or the like. Alternatively, it may be generated, for example, by a magnetic force. For example, when the ultrasonic linear actuator 1 is applied to an imager, the driven member 8 is coupled to a holding frame of a focusing lens or a zoom lens.

In an ultrasonic linear actuator adapted to transmit extending and contracting of a piezoelectric element to a driving member, and move a driven member engaged with the driving member with a predetermined frictional force, based on a difference between respective speeds during extending and during contracting of the piezoelectric element, a sawtooth waveform as a drive waveform for causing the speed difference will be discussed here. On the assumption that: a frequency of a drive signal to be given from a drive circuit to the piezoelectric element is denoted by fd; a first-order resonance frequency is denoted by fr1; a second-order resonance frequency is denoted by fr2; a phase lag of a first-order component of displacement of the driving member with respect to a first-order component of a drive voltage is denoted by $\theta1$; a phase lag of a second-order component of displacement of the driving member with respect to a second-order component of the drive voltage is denoted by $\theta2$; a phase lag of the second-order component of displacement with respect to the first-order component of displacement of the driving member is denoted by $\theta2'$; and an adjustment amount of the second-order component with respect to the first-order component the drive voltage is denoted by $\theta2''$, suppose that fr2=2 fr1, a double value of a phase deviation in the first-order component is applied to a phase deviation in the second-order component. Thus, $\theta2'$ can be normalized using $\theta1$, as follows: $\theta2'=\theta2-2\cdot\theta1$. Further, $\theta2''=-\theta2$.

Figure 24A:
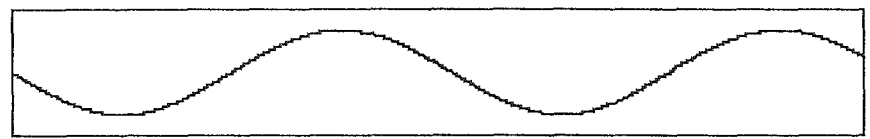
FIGS. 24A-24C are waveform charts for explaining one example of a method for forming the drive signal illustrated in FIG. 22.
Figure 24B:
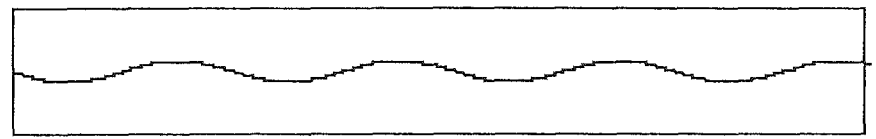
Figure 24C:

When the drive frequency fd is sufficiently less than the first-order resonance frequency fr1, it is necessary to drive the piezoelectric element by exactly inputting a sawtooth waveform thereinto. In this case, $\theta1=\theta2=0$, so that $\theta2'$ is also 0. On the other hand, in the Patent Document 2, the actuator is based on the theory that, when fd and fr1 are set to satisfy the following relationship: fd=0.7 fr1, $\theta1=-20°$ (lag), $\theta2=-130°$, and $\theta2'=-90°$, and therefore a displacement corresponding to the waveform in FIG. 24(C) is obtained from the waveforms in FIGS. 24 (A) and 24(B). Differently, the ultrasonic linear actuator 1 according to the first embodiment is based on the following theory. Considering that in a resonance state, each of the phase lags $\theta1$, $\theta2$ becomes 90°, fd, fr1 and fr2 are set to satisfy the following relationship: fd=fr1=0.5 fr2. Thus, even if the resonance frequency fr1 is used as the drive frequency, the phase lag $\theta2'$ of the second-order component with respect to the first-order component becomes −90° as with the case of fd=0.7 fr1, and therefore a sawtooth displacement can be obtained. Table 1 illustrates each drive conditions and a relationship of $\theta1$, $\theta2$ and $\theta2'$.

TABLE 1

| DRIVE CONDITION | NAME | θ1 | θ2 | θ2' | CALCULATION |
|---|---|---|---|---|---|
| fd << fr1 | SAWTOOTH VOLTAGE SIDM | 0 | 0 | 0 | =-0 - 2·0 |
| fd = 0.7fr1 | RECTANGULAR-WAVE VOLTAGE SIDM | -20 | -130 | -90 | =-130 - 2·(-20) |
| fd = fr1 = 0.5·fr2 | RESONANCE SIDM | -90 | -90 | 90 | =-90 - 2·(-90) |

Therefore, in the ultrasonic linear actuator 1 configured as above, according to the first embodiment, the piezoelectric elements 4, 5 and the driving members 6, 7 is formed to have at least first-order and second-order resonance modes, in response to a drive signal given from the aftermentioned drive circuit to the piezoelectric elements 4, 5, and adjusted to allow resonance frequencies of the two modes to have an approximately one-to-two relation, for example, by cutting/grinding or shaping. The adjustment method will be described below.

Figure 2:
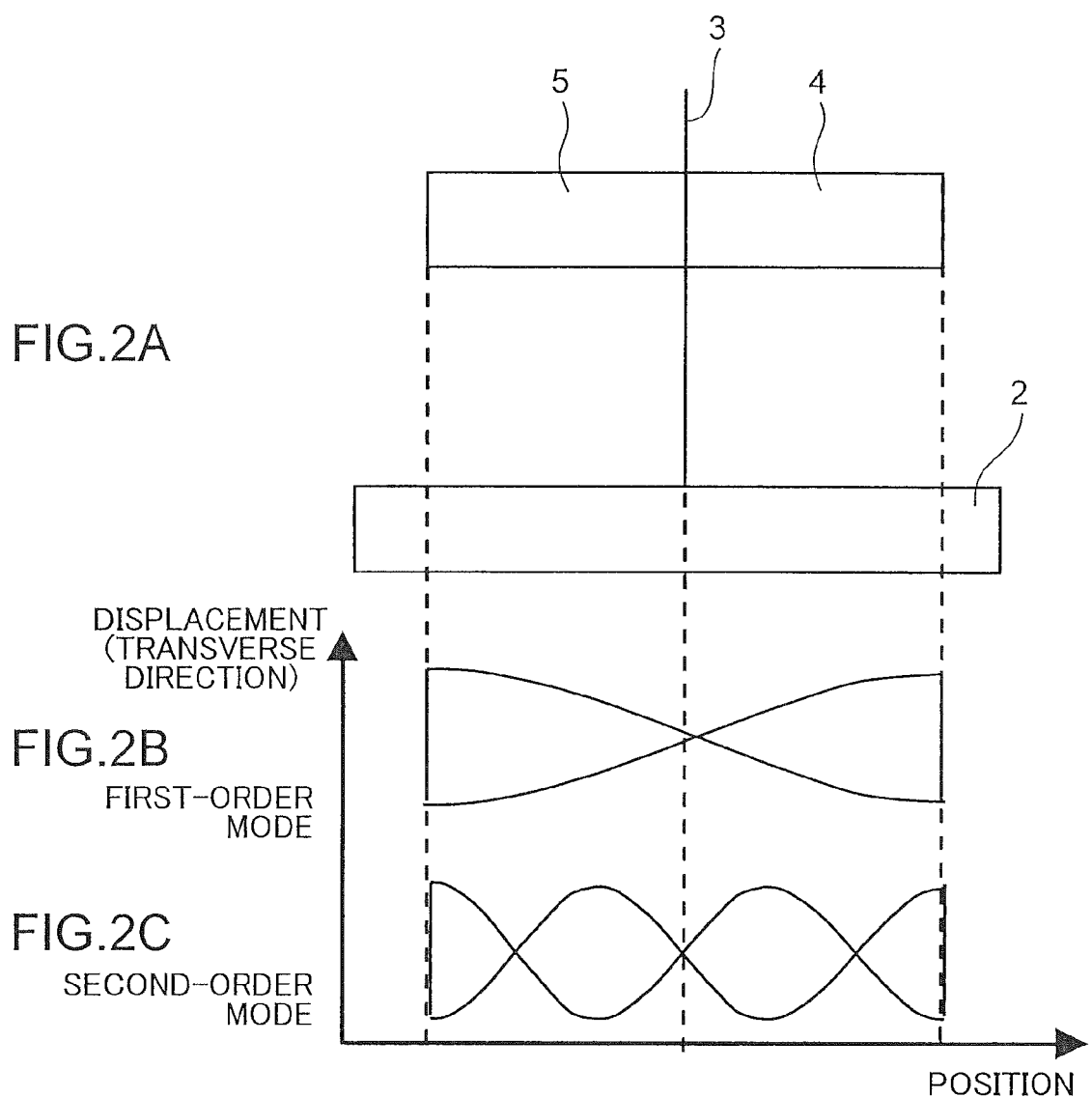
FIGS. 2A-2C are a side view schematically illustrating a state before adjustment of a vibration mode in the ultrasonic linear actuator illustrated in FIG. 1.

First of all, the piezoelectric elements 4, 5 are installed by themselves as illustrated in FIG. 2(A). In this state, the support plate 3 composed of a thin plate serves as a vibration node to produce a first-order resonance mode (first-order mode) and a second-order resonance mode (second-order mode), in a longitudinal direction of the piezoelectric elements 4, 5, as illustrated, respectively, in FIG. 2(B) and FIG. 2(C), wherein (the frequency fr2 of the second-order resonance mode)/(the frequency fr1 of the first-order resonance mode)=3. If this resonance frequency ratio 3 can be adjusted to 2, the following relationship is satisfied: θ2'=θ2-2·θ1=-90°, so that a pseudo-sawtooth displacement vibration can be produced.

Figure 3:
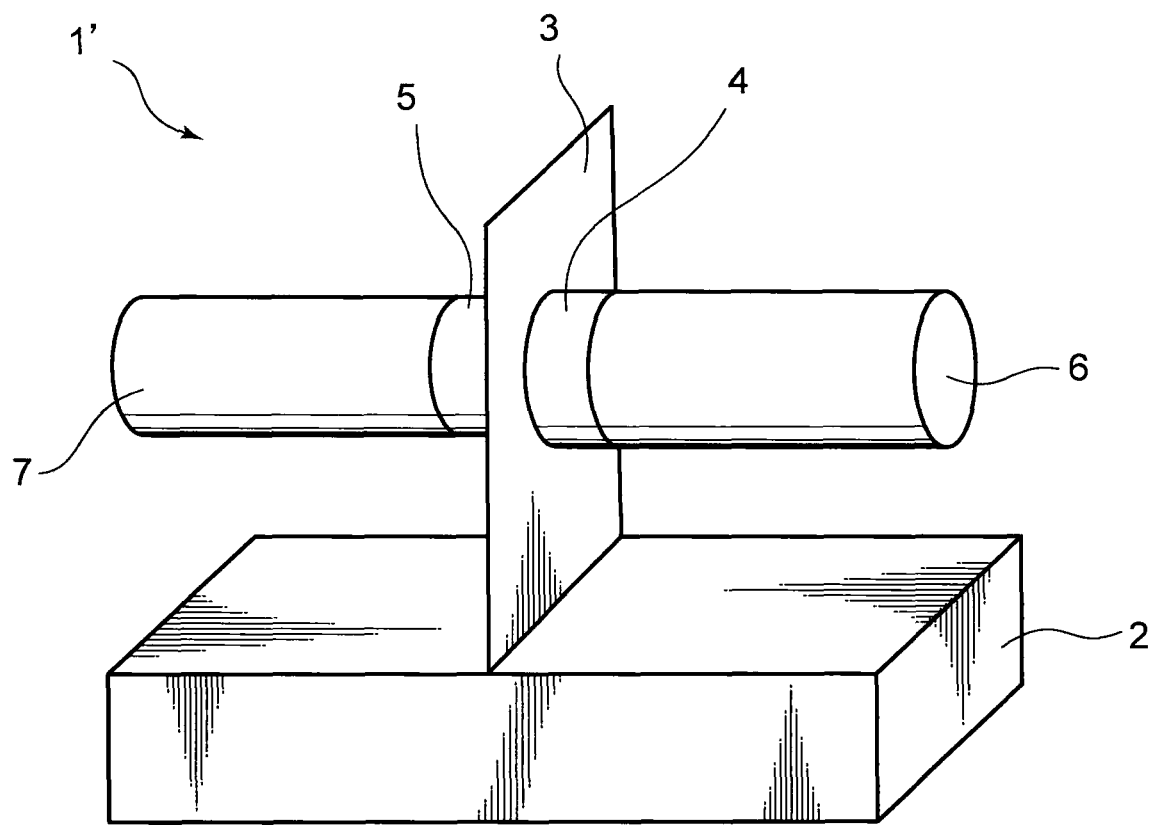
FIG. 3 is a perspective view schematically illustrating a state before adjustment of the vibration mode in the ultrasonic linear actuator illustrated in FIG. 1.

Then, each of the driving members 6, 7 is fixedly attached to one end of a respective one of the piezoelectric elements 4, 5, whereon duralumin is used as a material for the driving members 6, 7. For example, each of the piezoelectric elements 4, 5 has a diameter of 10 mm and a length (thickness) of 5 mm, and each of the driving members 6, 7 has a diameter of 10 mm and a length of 45 mm. An ultrasonic linear actuator 1' in this state is schematically illustrated in FIG. 3. However, the driven member 8 is omitted in FIG. 3.

In this state, as illustrated in FIG. 4A, each of the driving members 6, 7 is cut or shaved to reduce a diameter thereof only in a longitudinal range W from a distal end thereof. For example, the longitudinal range W is set to 25 mm. Based on shaving this portion, the resonance frequency ratio fr2/fr1 can be lowered, and a level of the lowering can be adjusted by a shaving amount. In regard to this mechanism, firstly, a resonance frequency fr is expressed as the following formula (2) in a lumped parameter circuit, wherein k is an equivalent spring constant, and m is an equivalent mass.

$$fr = 1/2\pi \cdot \sqrt{(k/m)} \quad (2)$$

Figure 5A:
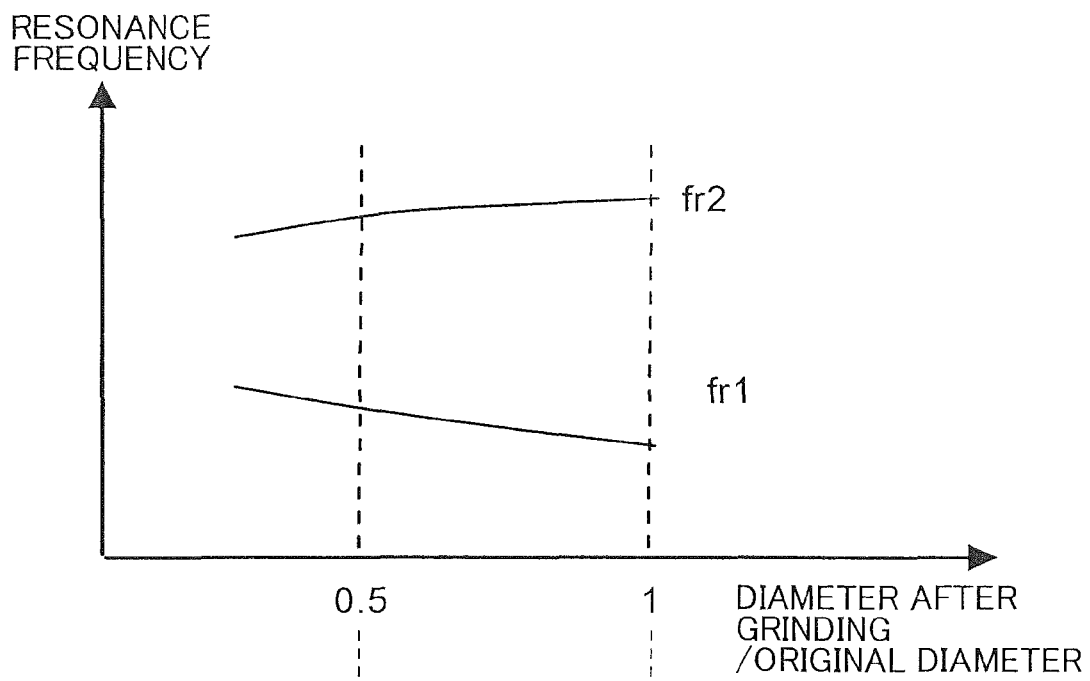
FIGS. 5A-5B are graphs illustrating a state of a change in resonance frequency of each of a first-order mode and a second-order mode, caused by the adjustment.
Figure 5B:
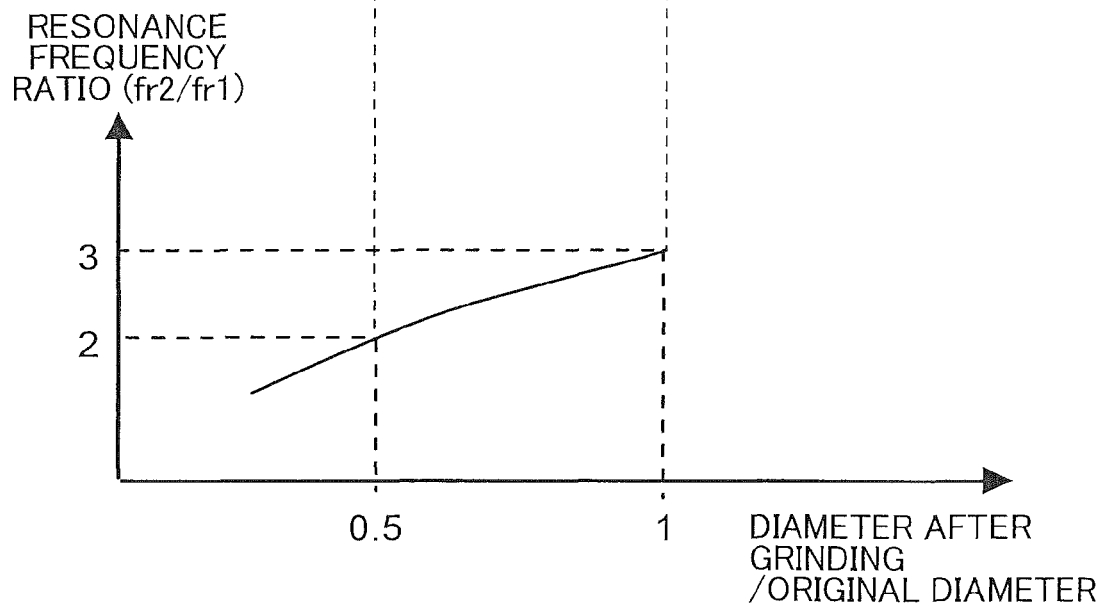

In general, when a portion of a vibrating body corresponding to a vibration antinode is shaved (mechanical impedance is lowered), the resonance frequency fr is increase (an effect of lowering "m" in the above formula). Further, when a portion of the vibrating body corresponding to a vibration node is shaved, the resonance frequency fr is also increased (an effect of lowering "k" in the above formula). In this example, as illustrated in FIG. 4(B), in the first-order mode, each of two shaved portions 6a, 7a in the longitudinal range W corresponds to a vibration antinode, so that, after the shaving, the resonance frequency fr is increased as indicated by a change from the solid line to the broken line. On the other hand, as illustrated in FIG. 4(C) in the second-order mode, there are both a vibration antinode and a vibration node in each of shaved portions 6a, 7a, so that no significant change occurs. FIG. 5(A) illustrates a relationship between the shaving amount and each of the first-order and second-order resonance frequencies fr1, fr2, and FIG. 5(B) illustrates a relationship between the shaving amount and the resonance frequency ratio fr2/fr1.

Figure 6:
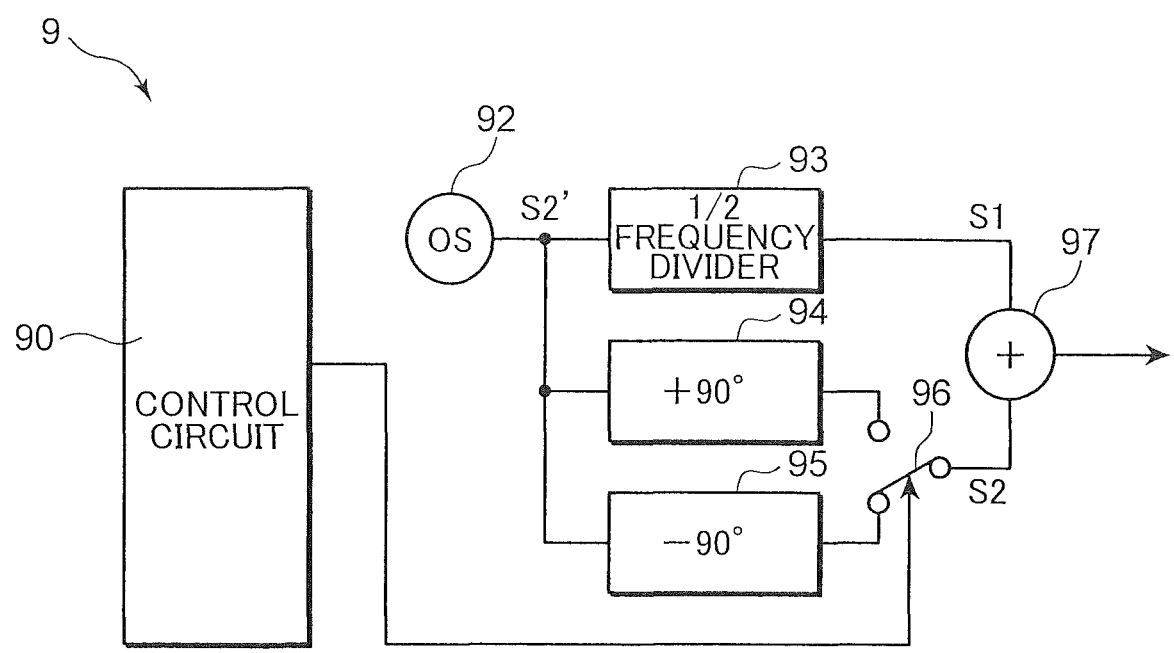
FIG. 6 is a block diagram illustrating one example of a configuration of a piezoelectric element drive circuit in the ultrasonic linear actuator illustrated in FIG. 1.

FIG. 6 is a block diagram of a drive circuit 9 which is one example of a configuration of a drive circuit for driving the piezoelectric elements 4, 5. This drive circuit 9 comprises a control circuit 90, an oscillator 92, a frequency divider 93, a phase shifter 94, a phase shifter 95, a change-over switch 96, and an adder 97. The oscillator 92 is operable to oscillate a signal S2' having the second resonance frequency fr2. This oscillation signal S2' is input into the frequency divider 93. The frequency divider 93 is operable to frequency-divide the oscillation signal S2' into halves to create a signal S1 having the first resonance frequency fr1. The oscillation signal S2' from the oscillator 92 is also input into each of the two phase shifters 94, 95. Then, the phase shifter 94 is operable to shift a phase of the oscillation signal S2' by +90° to create a signal S, and give it to one of two contact points of the change-over switch 96, and the phase shifter 95 is operable to shift the phase of the oscillation signal S2' by -90° to create a signal S, and give it to the other contact point of the change-over switch 96. The control circuit 90 is operable to switch the change-over switch 96 depending on the movement direction of the driven member 8. Thus, one of two signals S2 having a frequency of fr2, and phases mutually shifted by 180° and each shifted from the signal having the first resonance frequency fr1 by 90° is selected and input into the adder 97. The adder 97 is operable to add the signal S2 having the second resonance frequency fr2 and a phase shifted by +90° or -90°, to the signal S1 having the first resonance frequency fr1, and the output the resulting signal to the piezoelectric elements 4, 5.

FIG. 14 is an operational waveform chart of the above drive circuit 9. FIG. 14(A) and FIG. 14(B) illustrate the sinusoidal signal S1 having the frequency fr1 and the sinusoidal signal S2' having the frequency fr2, respectively. Assume that the phases of these signals are synchronized with each other. When these signals are added in the same phase, the resulting signal has an amplitude as illustrated in FIG. 14(C). In FIG. 14(C), an amplitude ratio between the sinusoidal signals S1, S2' is 2:1. On the other hand, FIG. 14(D) illustrates a signal formed by reducing a level of the signal S2' having the second resonance frequency fr2 (by increasing the amplitude ratio). In this manner, a sawtooth (triangular) waveform is produced to drive the driven member 8. When the signal S2' is phase-shifted, the resulting signal is changed as illustrated in FIG. 14(E) and FIG. 14(F), in this order.

Figure 14A:
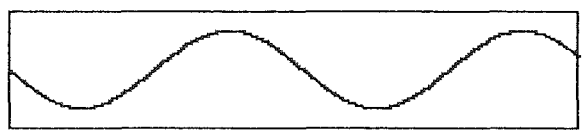
FIGS. 14A-14H are waveform charts illustrating a superimposition state of a drive signal in the ultrasonic linear actuator illustrated in FIGS. 12 and 13.
Figure 14B:
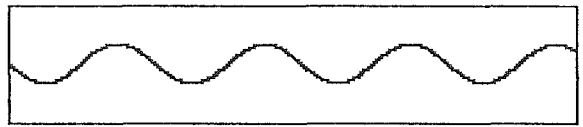
Figure 14C:
Figure 14D:
Figure 14E:
Figure 14F:
Figure 14G:
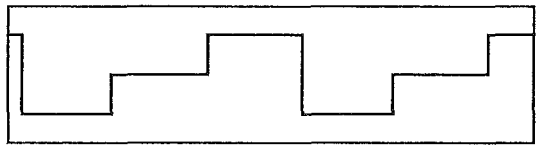
Figure 14H:
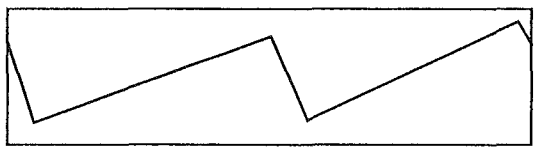

Thus, the waveform illustrated in FIG. 14(C) or FIG. 14(D) is used to drive the driven member. The driven member can be displaced in conformity to such a waveform input into the piezoelectric elements, only under the following condition: fd=fr1. In practice, under the condition that fd≈0.7 fr1 as in the Patent Document 2, or fd=fr1 as in the first embodiment, a phase lag in the second-order mode becomes large, and thereby a waveform to be input into the piezoelectric elements 4, 5 to provide a desired displacement waveform to the driven member 8 is as illustrated in Table 2 and Table 3 (drive waveforms in the drive circuit 9 illustrated in FIG. 6 is listed in the column "Only first-order+second-order sinusoidal wave").

Figure 7A:
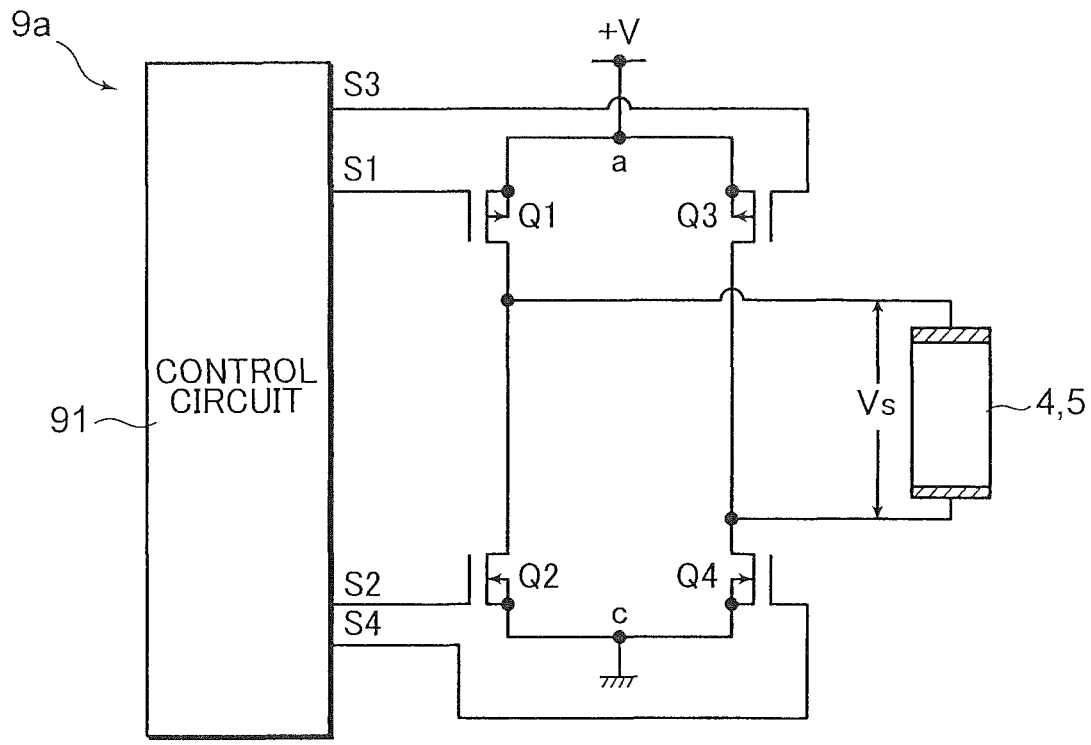
FIGS. 7A-7B are block diagrams illustrating another example of the configuration of the piezoelectric element drive circuit in the ultrasonic linear actuator illustrated in FIG. 1.

FIG. 7(A) is a block diagram of a drive circuit 9a which is another example of the configuration of the drive circuit for driving the piezoelectric elements 4, 5. This drive circuit 9*a* is a so-called H-bridge circuit which comprises a series circuit of a p-type FET Q1 and an n-type FET Q2, and a series circuit of a p-type FET Q3 and an n-type FET Q4, each connected between a+V power-supply line and a grounding line. Each of the piezoelectric elements 4, 5 is connected to couple respective midpoints of the series circuits. Each of the FETs Q1 to Q4 is on-off controlled by the control circuit 91.

Modes of control signals S1 to S4 to be output from the control circuit 91 to respective ones of the FETs Q1 to Q4, and a voltage Vs to be applied across opposite terminals of each of the piezoelectric elements 4, 5 according to ON/OFF of the FETs Q1 to Q4, are as illustrated, for example, in FIG. 8. In the example illustrated in FIG. 7(A), the two FETs Q1, Q4 or the two FETs Q2, Q3 provided at diagonal positions of the H-bridge are driven with the same phase, and the set of FETs Q1, Q4 and the set of FETs Q2, Q3 are driven with mutually reverse phases. In this way, a rectangular-wave drive signal is applied to the piezoelectric elements 4, 5. In this case, as illustrated in FIG. 8, a duty ratio of the drive signal can be set to about 0.3 to drive the driven member 8 in one direction, and can be set to about 0.7 to driven the driven member 8 in the opposite direction.

In the drive circuit 9*a* configured in this manner, a waveform to be input into the piezoelectric elements 4, 5 to provide a desired displacement waveform to the driven member 8 is as illustrated in Table 2 and Table 3 (listed in the column "Using H-bridge circuit"). In the Patent Document 2, the rectangular wave has the same phase as that of the sawtooth displacement waveform (duty ratio: 0.3), whereas, in the drive device 1 according to the first embodiment, the rectangular wave has a reverse phase with respect to the sawtooth displacement waveform (duty ratio: 0.7), as with the drive circuit 9. Thus, for backward drive, the duty ratio is 0.3.

As above, in the first embodiment, in the ultrasonic linear actuator 1 configured such that extending and contracting of each of the piezoelectric elements 4, 5 are transmitted to a respective one of the rod-shaped driving members 6, 7, and the driven member 8 engaged with the driving member 6 with a predetermined frictional force is moved based on a speed difference between during extending and during contracting of the piezoelectric element 4, 5, the following feature is employed in a signal from the drive circuit 9, 9*a* to the piezoelectric element 4, 5, to produce pseudo-sawtooth displacement vibration for causing the speed difference in an engagement section between the driving member 6 and the driven member 8.

Specifically, in order to produce the pseudo-sawtooth displacement vibration, vibration at a fundamental frequency is superimposed with at least harmonic vibration having a frequency two times as high as the fundamental frequency. In a conventional technique, based on setting a frequency of the rectangular-wave drive signal to about 0.7 times as high as a resonance frequency of a vibration system, vibration at a harmonic of the resonance frequency is obtained (across the resonance frequency). Differently, in the first embodiment, the drive signal is formed as a signal including two components having the resonance frequencies fr1, fr2 in which the resonance frequency ratio fr2/fr1 is about 2, and a shape of the piezoelectric elements 4, 5 and the driving members 6, 7 is adjusted to allow the piezoelectric elements 4, 5 and the driving members 6, 7 to be resonated at the two resonance frequencies fr1, fr2.

Thus, the piezoelectric elements 4, 5 and the driving members 6, 7 can be used in a resonance state, so that the displacement vibration can be multiplied by an amplitude amplification factor Q. In other words, the formula (1) can be changed to the following formula (3):

$$y = -Q\{\sin(\omega t) - 0.25 \cdot \sin(2\omega t)\} \quad (3)$$

In this way, in the ultrasonic linear actuator 1 according to the first embodiment, it becomes possible to improve a movement speed thereof, and allow a larger part of input energy to be used for mechanical vibration, so as to improve energy efficiency. Thus, the ultrasonic linear actuator 1 can be reduced in size or increased in torque, so that it can also be used for new purposes.

In the drive circuit 9*a*, a dead time when all of the FETs Q1 to Q4 are turned off to prevent power short-circuiting may be provided. Further, based on the drive circuit 9*a*, assume that the power-supply voltage is +V as mentioned above, the rectangular wave may be generated at three levels of −V, 0 and +V. For example, it may be a waveform providing a voltage illustrated in FIG. 14(G). In this case, a voltage itself to be input into each of the piezoelectric elements 4, 5 has a waveform close to the pseudo-sawtooth waveform, so that phase conditions in the first-order and second-order modes can be matched with each other. In place of the FETs Q1 to Q4, for example, bipolar transistors may be used to provide a triangular-wave illustrated in FIG. 14(H).

Figure 7B:
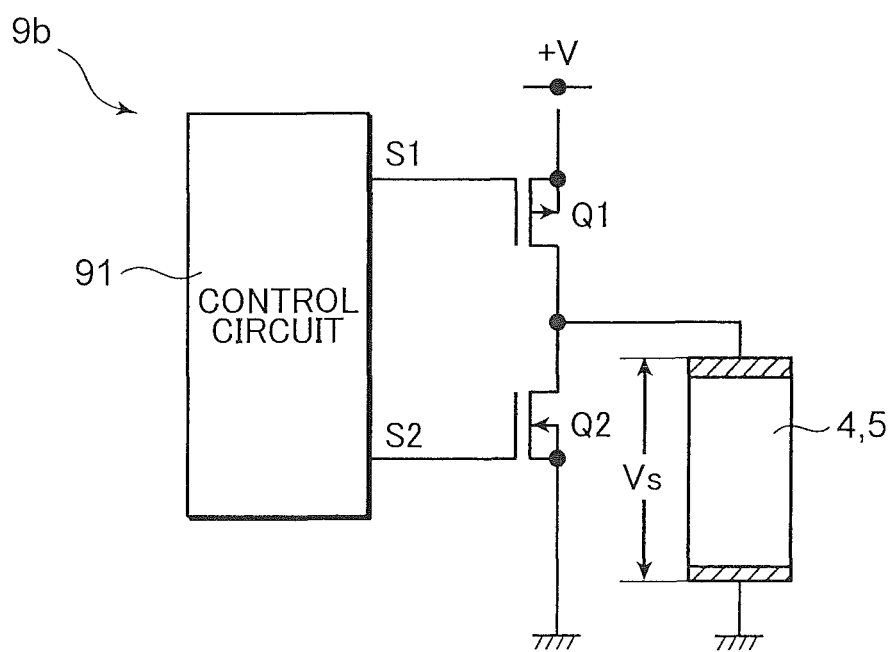

The drive circuit is not limited to the drive circuit 9*a* illustrated in FIG. 7(A), but may be composed of a simple push-pull circuit, such as a drive circuit 9*b* illustrated in FIG. 7(B). In the drive circuit 9*b*, an application voltage Vs to each of the piezoelectric elements 4, 5 is +V. On the other hand, the H-bridge circuit 9*a* illustrated in FIG. 7(A) is capable of applying a double voltage+2V to each of the piezoelectric elements 4, 5, and generating the three-level voltage.

In the ultrasonic linear actuator 1 according to the first embodiment, based on the phenomenon that the resonance frequency fr is increased by shaving a portion of the rod-shaped driving member 6, 7 corresponding to a vibration antinode (by lowering a mechanical impedance), a portion of the driving member in a predetermined range W which corresponds to a vibration antinode in the first-order resonance mode and corresponds to a vibration antinode and a vibration node in the second-order resonance mode is formed to be reduced in diameter, for example, by cutting or grinding. This makes it possible to increase the fundamental frequency fr1 of the first-order resonance mode, while maintaining the resonance frequency fr2 of the second-order resonance mode, so as to allow a ratio fr2/fr1 between the resonance frequencies to become 2, thereby efficiently producing the pseudo-sawtooth displacement vibration.

Another embodiment will be described below.

Second Embodiment

FIG. 9(A) is a side view schematically illustrating a structure of an ultrasonic linear actuator which is a drive device according to a second embodiment. In this ultrasonic linear actuator 11, an element or component similar to and corresponding to that in the ultrasonic linear actuator 1 illustrated in FIGS. 1 and 4 is assigned with the same reference numeral or code, and its description will be omitted. In the ultrasonic linear actuator 11, at least in the predetermined range W, an outer peripheral surface of a rod-shaped driving member 16 is formed as a continuous curved surface, i.e., the diameter of the driving member 16 is smoothly (continuously) changed in an axial direction thereof.

In FIG. 9(A), the outer peripheral surface of the driving member 16 is formed as a continuous curved surface over approximately the entire length thereof. Further, a driving member 17 having a constant diameter is coupled to a distal end of the driving member 16, and a driven member 8 is driven by the driving member 17. Thus, as illustrated in FIG. 9(B) and FIG. 9(C), the driving member 16 is an elastic body capable of producing first-order and second-order resonance modes as with the aforementioned driving members 6, 7. On the other hand, the driving member 17 is made of a material for allowing the driving member 17 to behave as a rigid body at frequencies fr1, fr2 of the two resonance modes, i.e., the material of the driving member 17 is required to have a high elastic modulus. In order to reduce a load on a distal end side of the driving members 16, 17, the driving member 17 is also required to have a low density. For this purpose, the driving member 16 is made, for example, of duralumin as with the first embodiment, and the driving member 17 is made, for example, of carbon fiber. However, an adequate shape of the driving member 16 is changed due to the driving member 17 coupled thereto. Thus, under a condition that the driving member 17 is coupled to the driving member 16, the shape of the driving member 16 is adjusted to allow the resonance frequency ratio fr2/fr1 to become 2.

In the ultrasonic linear actuator 11 configured in this manner, the driving member 16 is formed in an optimal shape capable of providing the resonance frequency ratio 2, and eliminating a stepped portion. Thus, it can be expected to avoid stress concentration to improve reliability, and minimize vibration loss (increase Q) to achieve further improved speed performance based on resonance.

In the ultrasonic linear actuator 11, when the driving members 16, 17 are formed to extend from a piezoelectric element 4, only one set of them is provided, and one end of the piezoelectric element 4 in the vibration direction is fixed to a fixed object 13. In other words, as a support member for the piezoelectric element 4 and the driving members 16, 17, a fixed object is used which is made of a material having a high density and a high elastic modulus, such as tungsten, and formed to have a weight sufficiently greater than that of these components.

This configuration makes it possible to eliminate the need for providing an additional set of the piezoelectric element 4 and the driving members 16, 17, to allow vibration generated in the piezoelectric element 4 to be propagated toward the driving members 16, 17, thereby downsizing the configuration.

Another embodiment will be described below.

Third Embodiment

Figure 10:
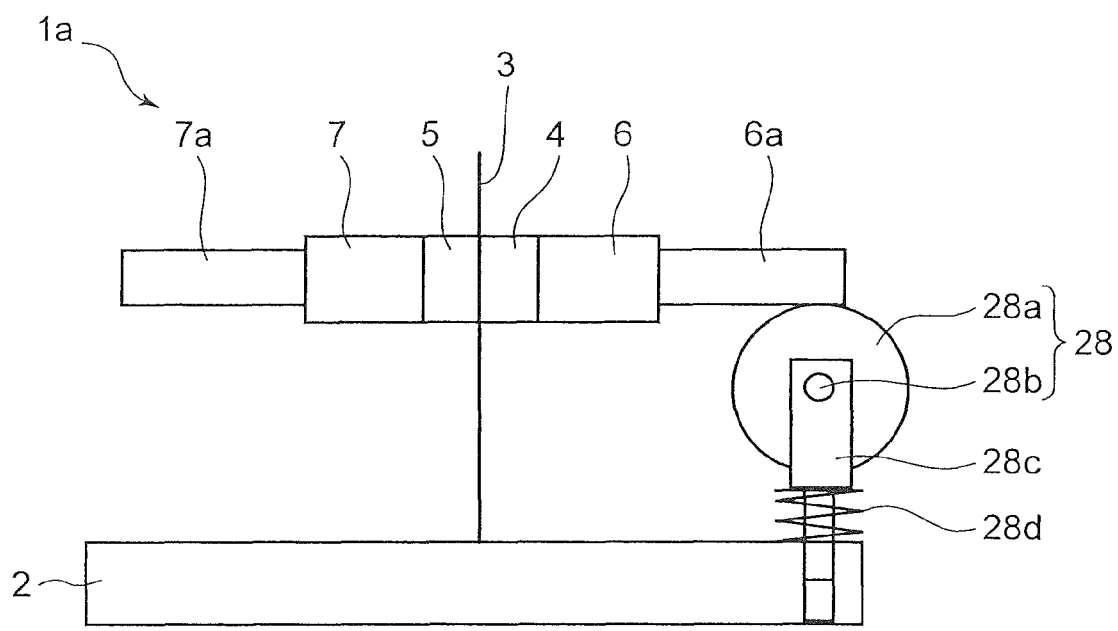
FIG. 10 is a side view schematically illustrating one example of a structure of an ultrasonic motor which is a drive device according to a third embodiment.
Figure 11:
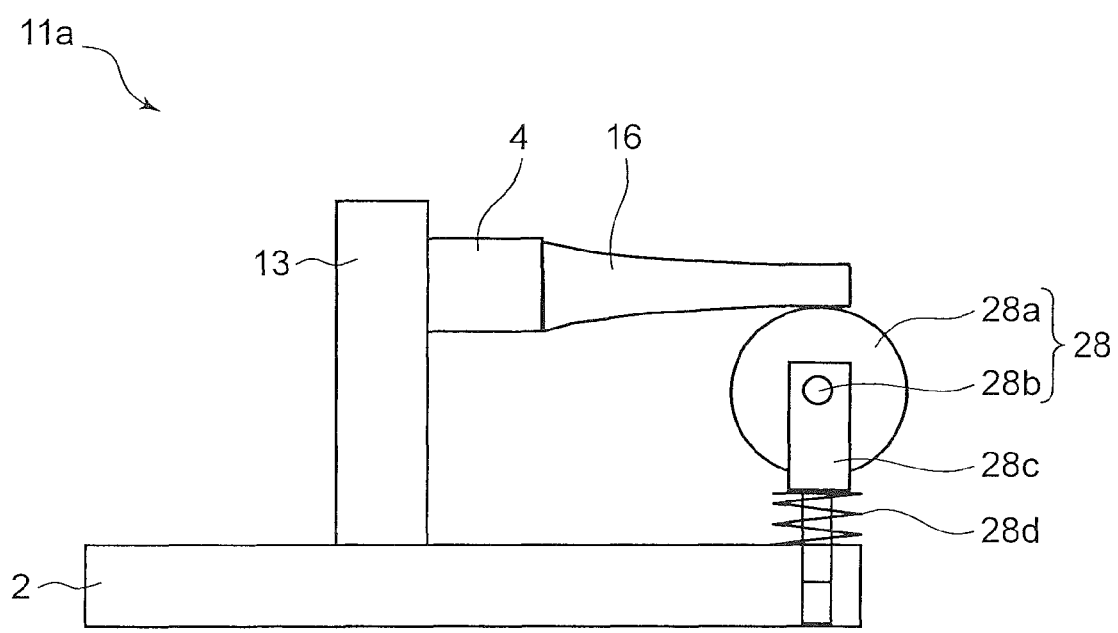
FIG. 11 is a side view schematically illustrating another example of the structure of the ultrasonic motor which is the drive device according to the third embodiment.

FIGS. 10 and 11 are side views schematically illustrating respective structures of two types of ultrasonic motors each of which is a drive device according to a third embodiment. In these ultrasonic motors 1a, 11a, an element or component similar to and corresponding to that in the ultrasonic linear actuators 1, 11 illustrated in FIGS. 1, 4 and 9 is assigned with the same reference numeral or code, and its description will be omitted. In the ultrasonic motors 1a, 11a, a driven member 28 comprises a rotor 28a having an outer peripheral surface serving as an engagement section with respect to a driving member 6, 16, and an output take-out shaft 28b serving as a rotary shaft of the rotor. The an output take-out shaft 28b is rotatably supported by a pair of brackets 28c, and the bracket 28c is elastically biased by a support member 28b in a direction from a fixed position of a fixed member 2 or the like toward the driving member 6, 16.

Based on this configuration, a displacement of the driving member 6, 16 in the vibration direction, i.e., a linear displacement, is converted to a high-speed rotational displacement and taken out. In the ultrasonic motor 11a illustrated in FIG. 11, on the assumption that an influence of a curved surface of the driving member 16 on an engagement between the rotor 28a and the driving member 16 can be absorbed by an elastic force of the support member 28d or the like because an engagement section with respect to the rotor 28a is very small, a driving member 17 is not coupled to the driving member 16. However, in a situation where the influence occurs due to a sharp sloping of the curved surface or a large amplitude (stroke) of the driving member 16, the driving member 17 may be coupled thereto.

Another embodiment will be described below.

Fourth Embodiment

Figure 12:
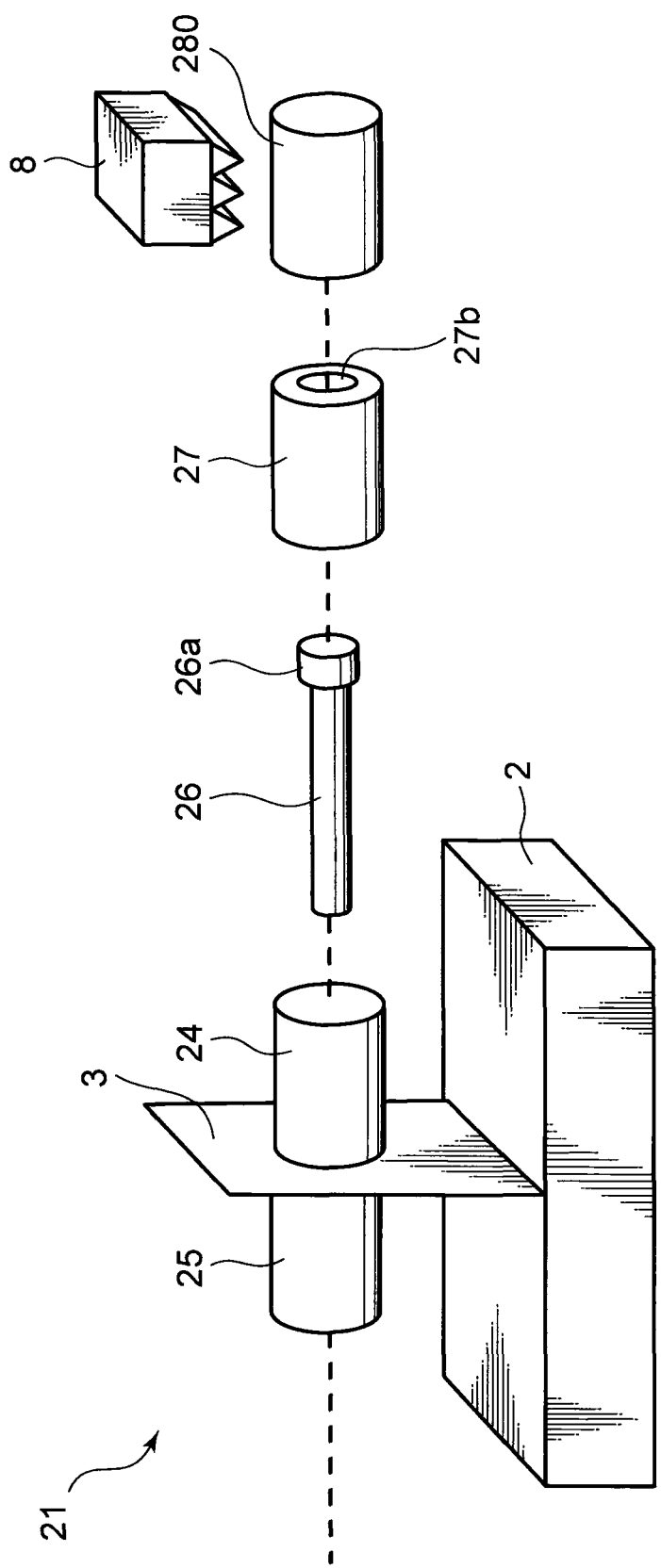
FIG. 12 is a perspective view schematically illustrating a structure of an ultrasonic linear actuator which is a drive device according to a fourth embodiment.

FIG. 12 is a perspective view schematically illustrating a structure of an ultrasonic linear actuator which is a drive device according to a fourth embodiment, and FIG. 13 is a sectional view of the ultrasonic linear actuator. In this ultrasonic linear actuator 21, an element or component similar to and corresponding to that in the ultrasonic linear actuators 1, 11 illustrated in FIGS. 1, 4 and 9 is assigned with the same reference numeral or code, and its description will be omitted. The ultrasonic linear actuator 21 comprises, as a piezoelectric element, two first piezoelectric elements 24, 25 each having a resonance frequency fr1, and a second piezoelectric element 27 having a resonance frequency fr2, wherein the piezoelectric element 24 and the piezoelectric element 27 are coupled together through a coupling member 26.

More specifically, the piezoelectric element 25 in the piezoelectric elements 24, 25 each having one end attached to a respective one of opposite surfaces of a support plate 3 composed of a thin plate is a dummy for cancelling out vibration against the support plate 3, and one end of the coupling member 26 is fixedly attached to the other end of the piezoelectric element 24. The other end of the coupling member 26 is formed as a large-diameter head 26a which is fitted into an inner peripheral surface 27b of the piezoelectric element 27 formed in a tubular shape, and fixedly attached to the piezoelectric element 27 at an intermediate position in a length direction thereof (the vibration direction). Thus, vibration of the piezoelectric element 24 is transmitted to the intermediate position of the piezoelectric element 27 only through the coupling member 26. Further, a driving member 280 made of carbon fiber as with the driving member 17 is coupled to an end face of the piezoelectric element 27 on a side opposite to the coupling member 26, and a driven member 8 is frictionally engaged with the driving member 280.

In the ultrasonic linear actuator 21, a sinusoidal signal having a resonance frequency fr1 is given to each of the first piezoelectric elements 24, 25, and a sinusoidal signal having a resonance frequency fr2 is phase-adjusted and then given to the second piezoelectric element 27. Specifically, when a displacement y1 is given to the first piezoelectric element 24, a portion A in FIG. 13 has the displacement y1. Further, when a displacement y2 is given to the second piezoelectric element 27, a portion B has a displacement y1+y2. In this way, the two piezoelectric elements 24, 27 can be used to superimpose two displacements. For example, a length of each of the first and second piezoelectric elements is adjusted such that the resonance frequency fr1 of each of the first piezoelectric elements 24, 25 is set to 100 kHz, and the resonance frequency fr2 of the second piezoelectric element 27 is set to 200 kHz. In this case, when voltages expressed as the following formulas are applied, wherein V1 and V2 are respective voltages to be applied to each of the piezoelectric elements 24, 25 and the piezoelectric element 27, both of the piezoelectric elements 24, 25; 27 are placed in a resonance state, and a sawtooth displacement is obtained in the portion B.

$$V1=-\sin(2\pi \cdot 100 k \cdot t)$$

$$V2=-0.25*\sin(2\pi \cdot 200 k \cdot t)$$

As above, in the fourth embodiment, in the ultrasonic linear actuator 21 configured such that extending and contracting of the piezoelectric elements 24, 27 are transmitted to the rod-shaped driving member 280, and the driven member 8 engaged with the driving member 280 with a predetermined frictional force is moved based on a speed difference between during extending and during contracting of the piezoelectric elements 24, 27, the following feature is employed to produce pseudo-sawtooth displacement vibration for causing the speed difference in an engagement section between the driving member 280 and the driven member 8.

Specifically, the two piezoelectric elements 24, 27 are provided such that the first piezoelectric element 24 is located on a fixed side, and the second piezoelectric element 27 is located on a driving side, wherein the coupling member 26 is provided to couple therebetween, and the driving member 280 is fixedly attached to the second piezoelectric element 27. Further, the driven member 8 is engaged with the driving member 280 with a predetermined frictional force. Then, two phase-adjusted sinusoidal-wave drive signals are given from a non-illustrated drive circuit to the first and second piezoelectric elements 24, 27, respectively. Thus, a resonance of the first piezoelectric element 24 and the coupling member 26 at the fundamental resonance frequency fr1, and a resonance of the second piezoelectric element 27 at the frequency fr2 which is two times as high as the fundamental resonance frequency fr1, are superimposed, so that pseudo-sawtooth displacement vibration is produced in the engagement section between the driving member 280 and the driven member 8 to cause the speed difference.

Therefore, in the ultrasonic linear actuator 21, the first and second piezoelectric elements 24, 27 and the coupling member 26 can be used in a resonance state, so that the displacement vibration can be multiplied by an amplitude amplification factor Q to improve the movement speed, and allow a larger part of input energy to be used for mechanical vibration, so as to improve energy efficiency. Thus, the ultrasonic linear actuator 21 can be reduced in size or increased in torque, so that it can also be used for new purposes.

Figure 15:
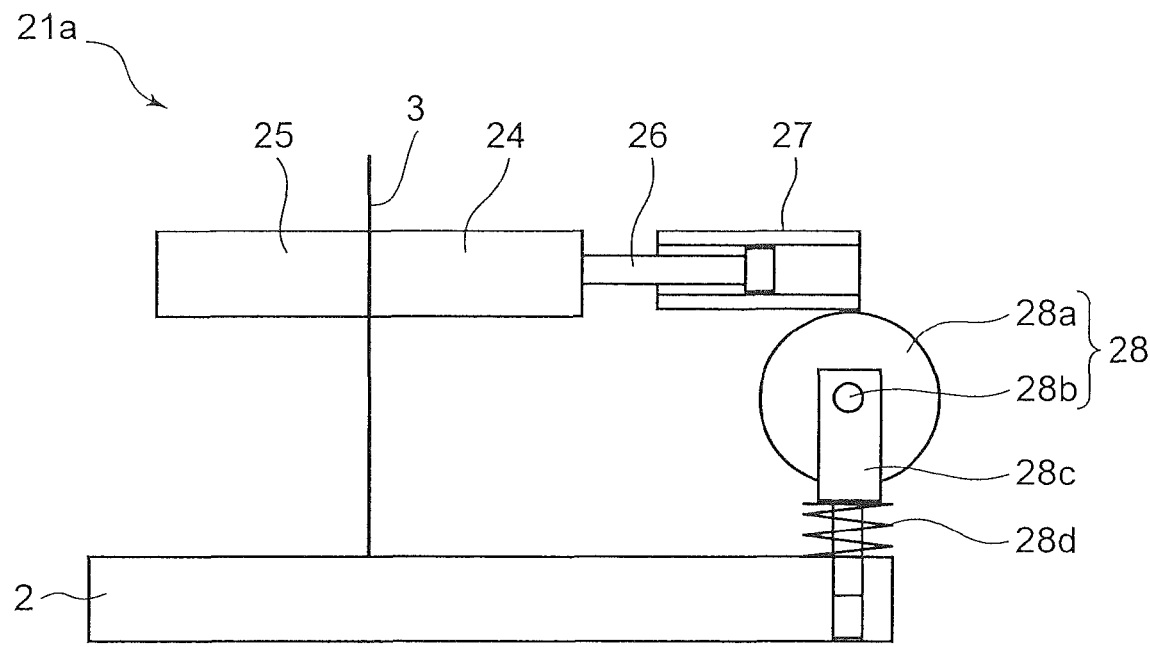
FIG. 15 is a sectional view schematically illustrating a structure of an ultrasonic motor which is the drive device according to the fourth embodiment.

The ultrasonic linear actuator 21 may be modified to an ultrasonic motor as illustrated in FIG. 15, by using a driven member 28 comprising a rotor 28a and an output take-out shaft 28b, in place of the driven member 8, in the same manner as that in the ultrasonic motors 1a, 11a illustrated in FIGS. 10 and 11. In this case, a rotational displacement is output.

Another embodiment will be described below.

Fifth Embodiment

Figure 16:
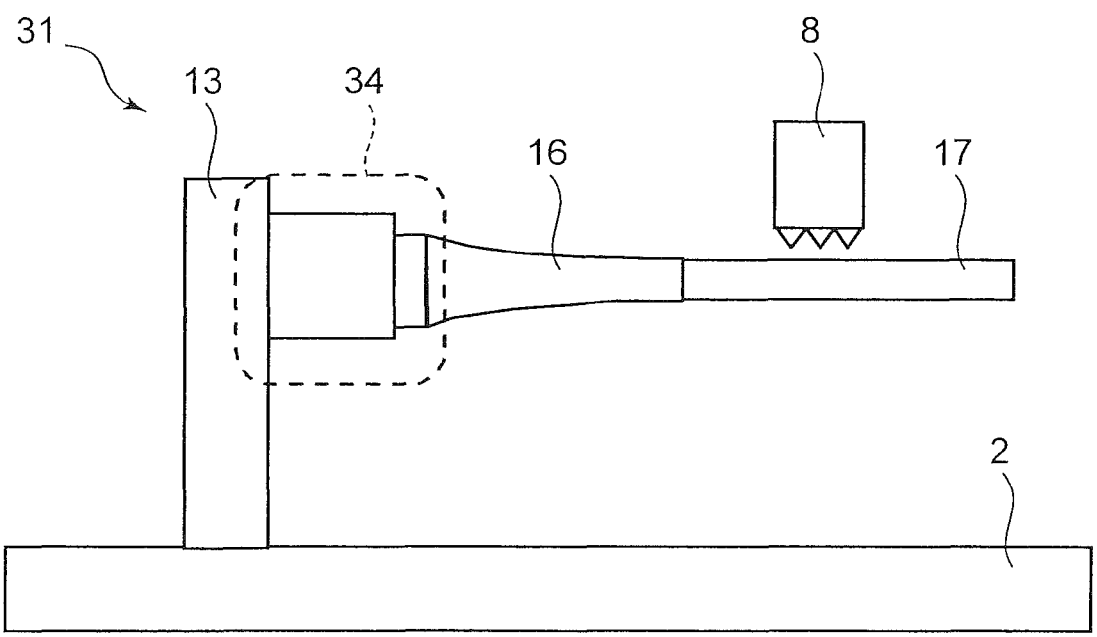
FIG. 16 is a side view schematically illustrating a structure of a linear actuator which is a drive device according to a fifth embodiment.

FIG. 16 is a side view schematically illustrating a structure of a linear actuator which is a drive device according to a fifth embodiment. In this linear actuator 31, an element or component similar to and corresponding to that in the ultrasonic linear actuator 11 illustrated in FIG. 9(A) is assigned with the same reference numeral or code, and its description will be omitted. In the linear actuator 31, a voice coil motor 34 is employed as a vibrator.

Specifically, the aforementioned piezoelectric elements 4, 5, 24, 25, and so on are used only for outputting displacement (outputting a force). Thus, the vibrator is not limited to a piezoelectric element, but may be realized using any other suitable mechanical output element. In the fifth embodiment, the voice coil motor 34 is employed which is one example of a magnetostrictor which is a solid-state actuator as with a piezoelectric element. It is to be understood that the same drive principle may be applied to an electromagnetic actuator such as a giant magnetostrictor, and an electrostatic actuator, as well as the voice coil motor 34. In the voice coil motor 34, a frequency response thereof is low. Thus, the driving member 16 is made of a low-rigidity material to produce a resonance. For this purpose, a plastic material is employed.

Another embodiment will be described below.

Sixth Embodiment

Figure 17:
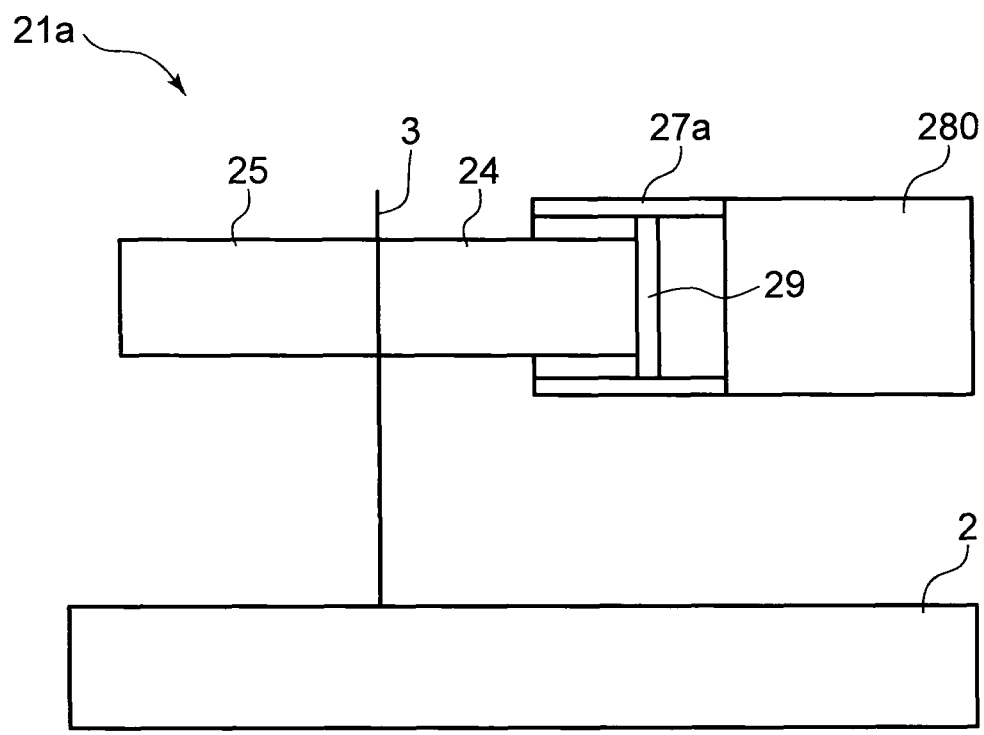
FIG. 17 is a sectional view schematically illustrating a structure of an ultrasonic linear actuator which is a drive device according to a sixth embodiment.

FIG. 17 is a sectional view schematically illustrating a structure of an ultrasonic linear actuator which is a drive device according to a sixth embodiment. In this ultrasonic linear actuator 21a, an element or component similar to and corresponding to that in the ultrasonic linear actuator 21 illustrated in FIG. 13 is assigned with the same reference numeral or code, and its description will be omitted. In the ultrasonic linear actuator 21a, a second piezoelectric element 27a is formed to have a diameter greater than that of a first piezoelectric element 24, and insertingly receive the first piezoelectric element 24.

More specifically, a coupling member 29 is formed in a circular disk shape having a diameter greater than that of the first piezoelectric element 24, and fixedly attached to one end of the first piezoelectric element 24. The second piezoelectric element 27a is formed in a tubular shape to insertingly receive the coupling member 29 and the first piezoelectric element 24, and fixedly attached to an outer peripheral edge of the coupling member 29 at a midpoint thereof in the vibration direction. A driving member 28 is attached to an end of the second piezoelectric element 27a on a side opposite to the first piezoelectric element 24, to serve as an engagement section with respect to a driven member 8.

The ultrasonic linear actuator 21a constructed in this manner can enhance support strength for the second piezoelectric element 27a with respect to the first piezoelectric element 24.

Another embodiment will be described below.

Seventh Embodiment

Figure 18A:
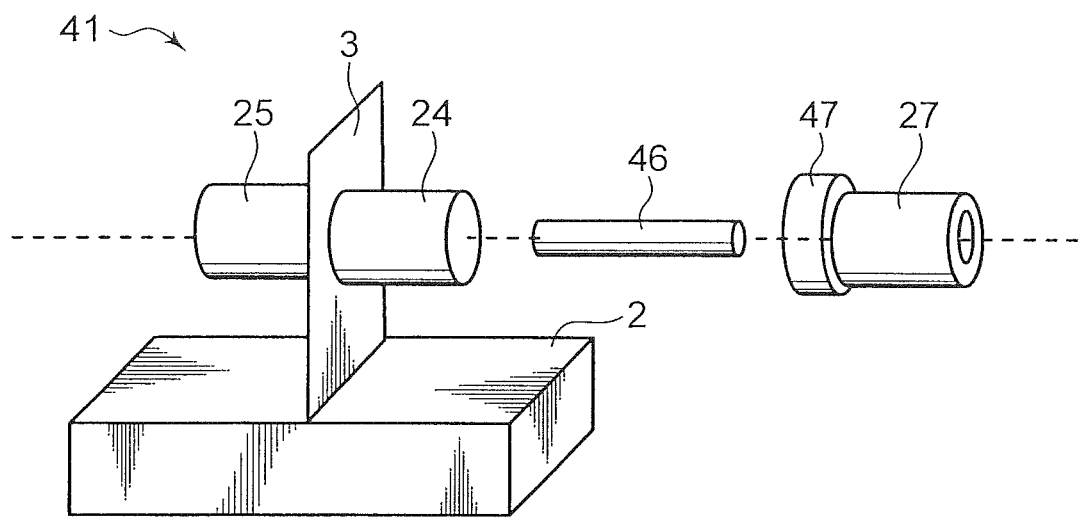
FIGS. 18A-18B are views schematically illustrating a structure of an ultrasonic linear actuator which is a drive device according to a seventh embodiment.
Figure 18B:
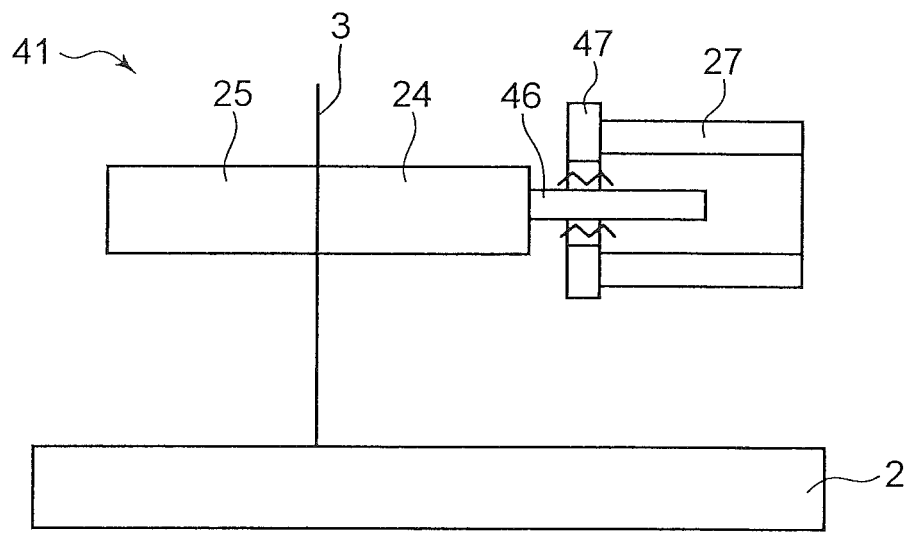

FIG. 18(A) is a perspective view schematically illustrating a structure of an ultrasonic linear actuator which is a drive device according to a seventh embodiment, and FIG. 18(B) is a sectional view of the ultrasonic linear actuator. In this ultrasonic linear actuator 41, an element or component similar to and corresponding to that in the ultrasonic linear actuator 21, 21a illustrated in FIGS. 13 and 17 is assigned with the same reference numeral or code, and its description will be omitted. In the case where two piezoelectric elements 24, 27 are used, the ultrasonic linear actuator 41 comprises a first driving member 46 formed in a rod shape and provided between the first piezoelectric element 24 and the second piezoelectric element 27, wherein the rod shape first driving member 46 has a base end is fixedly attached to the first piezoelectric element. Each of the second piezoelectric element 27 and a second driving member 47 is formed in a tubular shape to insertingly receive the first driving member 46. Then, the second driving member 47 has an inner peripheral surface frictionally engaged with an outer peripheral surface of the first driving member 46, and the second piezoelectric element 27 is fixedly attached to an end of the second driving member 47 on a side opposite to the first piezoelectric element 24.

The ultrasonic linear actuator 41 configured in this manner can also superimpose resonance vibrations using the two piezoelectric elements 24, 25; 27 applied with respective sinusoidal signals. In this embodiment, the first driving member 46 is driven by a simple sinusoidal wave, and the second driving member 47 is also driven by a simple sinusoidal wave having a double frequency. Then, a pseudo-sawtooth relative displacement is produced in a frictional engagement section between the two driving members, and a set of the first piezoelectric element 24 and the first driving member 46, and a set of the second piezoelectric element 27 and the second driving member 47, are relatively moved in the vibration direction (In this embodiment, the set of the first piezoelectric element 24 and the first driving member 46 is fixed to a support plate 3 provided to stand upwardly from a fixed member 2. Thus, the set of the second piezoelectric element 27 and the second driving member 47 is moved as a driven member.)

Figure 19:
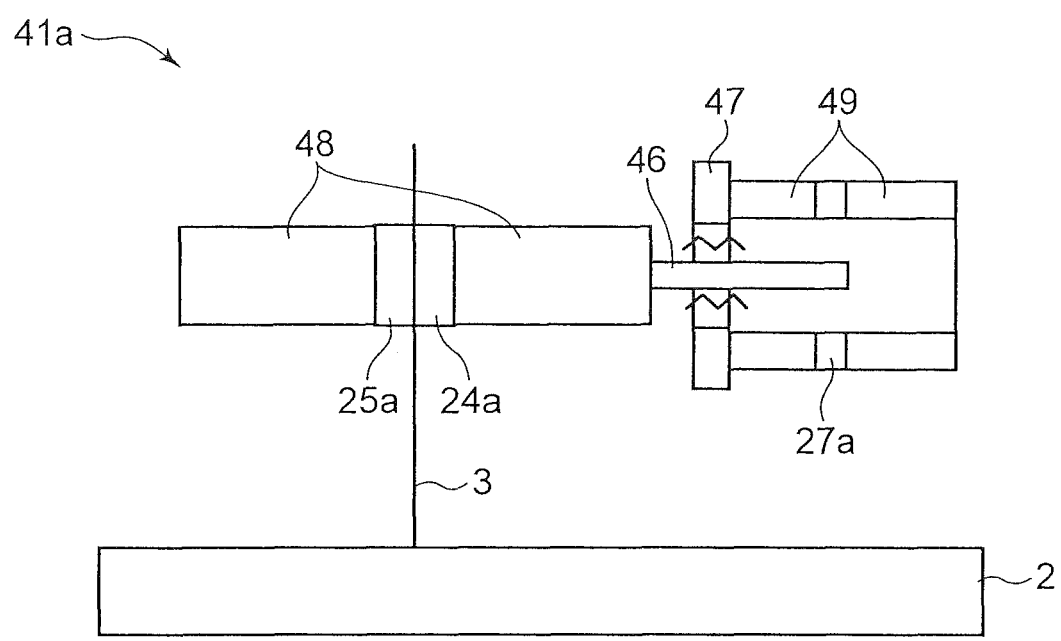
FIG. 19 is a sectional view schematically illustrating another example of the ultrasonic linear actuator illustrated in FIG. 18.
Figure 20:
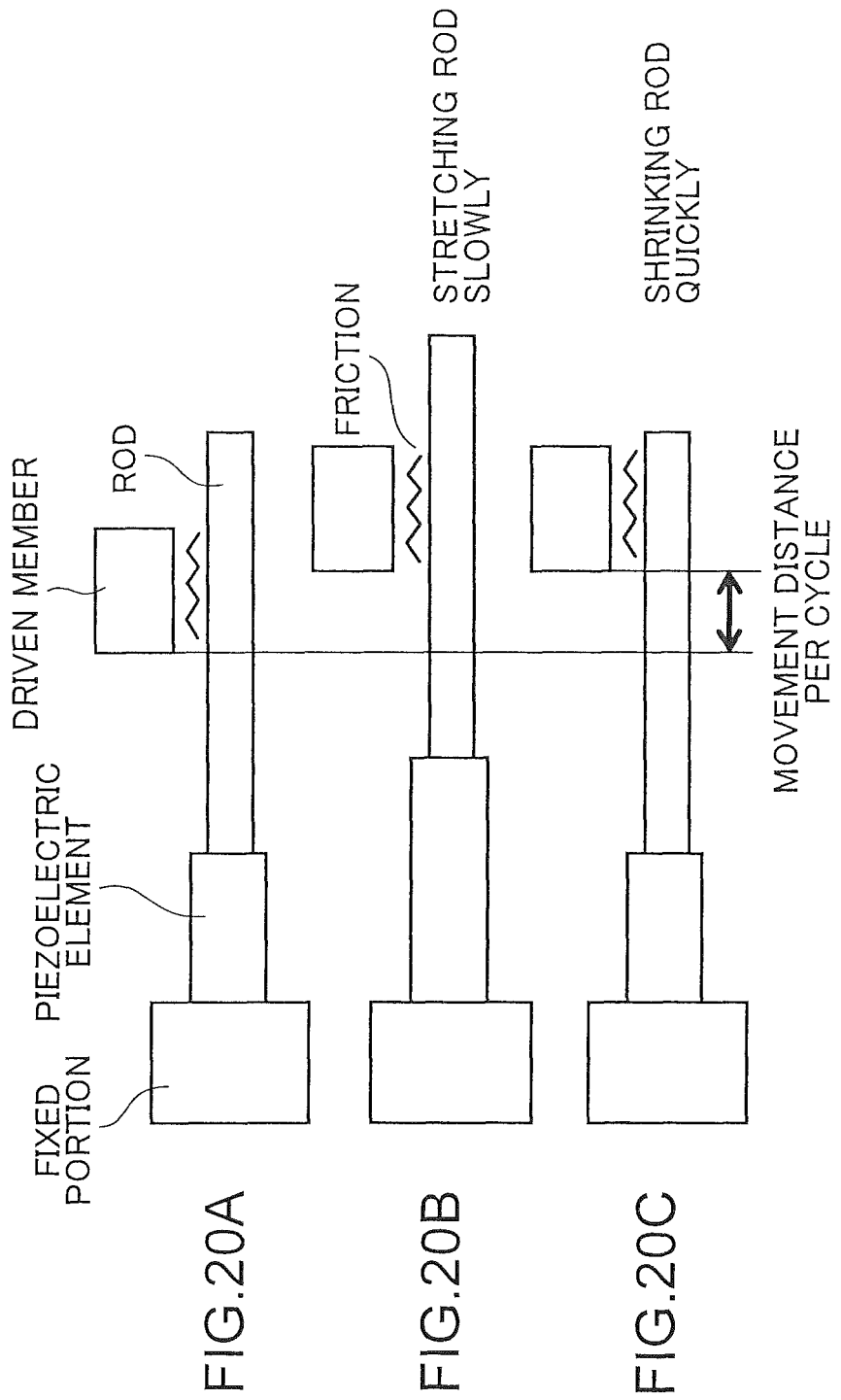
FIGS. 20A-20C are a side view schematically illustrating a structure of a typical conventional ultrasonic linear actuator.
Figure 21:
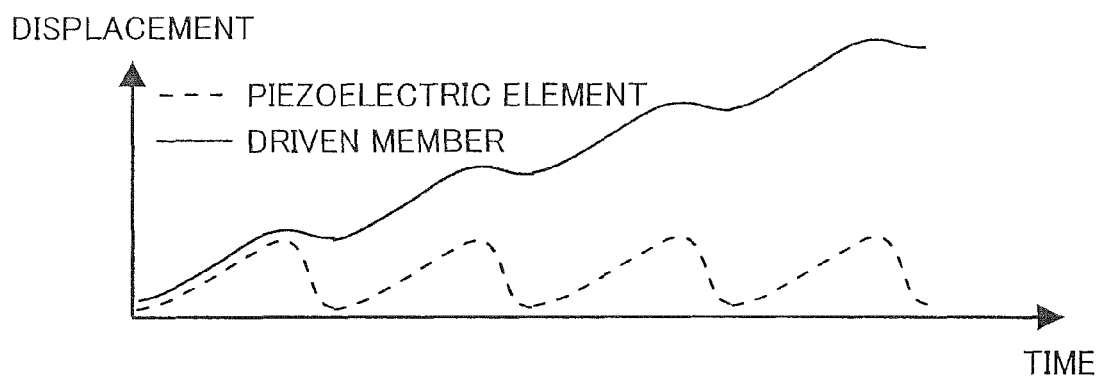
FIG. 21 is a graph illustrating a relationship between respective displacements of a piezoelectric element and a driven member over time, in an ultrasonic linear actuator.
Figure 22:
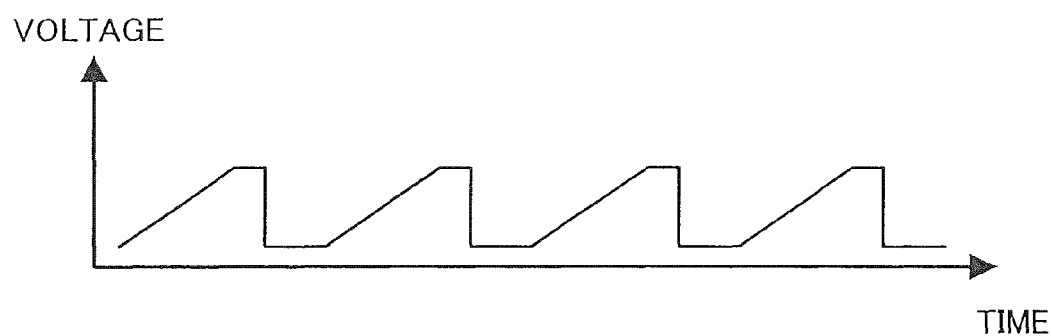
FIG. 22 is a waveform chart of a typical conventional drive signal to be given to an ultrasonic linear actuator.
Figure 23:
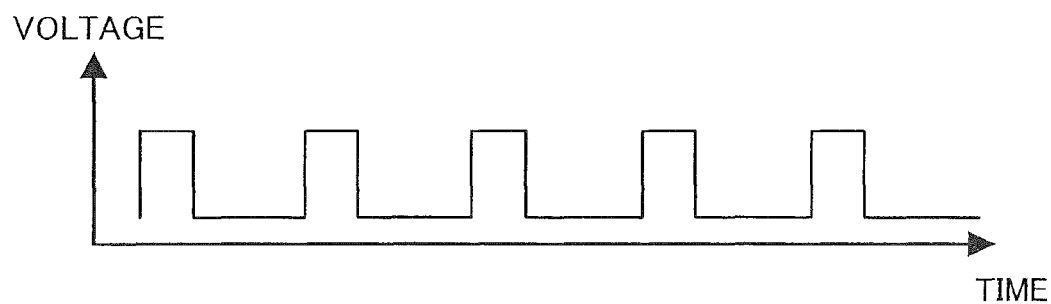
FIG. 23 is a waveform chart of a drive signal to be given to a conventional ultrasonic linear actuator and an ultrasonic linear actuator according to one embodiment of the present invention.

It is not necessarily the case that a component corresponding to each of the piezoelectric elements 24, 25; 27 consists entirely of a piezoelectric element, such as an ultrasonic linear actuator 41a illustrated in FIG. 19, but only a central portion of the component may be formed as a piezoelectric element 24a, 25a; 27a, and remaining portions on both sides of the central portion may be formed as vibration transmission members 48, 49.

Although the resonance mode described in the above embodiments is longitudinal vibration, a resonance mode usable in the embodiments may be any type, such as transverse vibration, flexural vibration or torsional vibration, or may be any combination of different vibration modes, such as a combination of longitudinal vibration and flexural vibration.

In conventional ultrasonic linear actuators, a material having a large piezoelectric constant is often used in order to take out a large displacement. However, the material having a large piezoelectric constant exhibits a low Q in a resonance state. Thus, in an ultrasonic linear actuator according to the embodiments, it is desirable to use a hard type piezoelectric element having a high Q in a resonance state, even if it has a low piezoelectric constant. For example, the Q value is 1000 or more in one embodiment, preferably at least 100 or more. Further, in conventional ultrasonic linear actuators, a laminated piezoelectric element capable of large displacement is often used in order to obtain high speed. However, an ultrasonic linear actuator according to the embodiments can achieve sufficiently high power even using lower-cost bulk piezoelectric elements, and can achieve sufficient drive performance even using minute piezoelectric elements.

This specification discloses various technical aspects as mentioned above. Among them, major aspects will be summarized as follows.

According to an aspect, there is provided a drive device which comprises: a first vibrator adapted to be vibrated in a predetermined direction as a vibration direction; a driving member attached to one end of the first vibrator in the vibration direction and adapted to be displaceably driven in the vibration direction by the first vibrator; a driven member engaged with the driving member with a predetermined frictional force; and a drive circuit for giving a drive signal to the first vibrator to vibrate the first vibrator, wherein: the first vibrator is formed to have at least first-order and second-order resonance modes in a vibration system, and allow a frequency of the second-order resonance mode to become approximately two times as high as a frequency of the first-order resonance mode; and the drive circuit is operable to generate a signal by superimposing at least two components approximately conforming to respective ones of the frequencies of the first-order and second-order resonance modes having the approximately one-to-two relation, and give the signal to the first vibrator as the drive signal, thereby producing resonantly-amplified pseudo-sawtooth displacement vibration in an engagement section between the driving member and the driven member, to move the driven member in the vibration direction. Preferably, in the above drive device, the driven member is moved based on a speed difference between during extending and during contracting in a course of displacement of the first vibrator.

In the aspect, in the ultrasonic linear actuator configured such that extending and contracting of the first vibrator such as a piezoelectric element are transmitted to the driving member, and the driven member engaged with the driving member with a predetermined frictional force is moved based on a speed difference between during extending and during contracting of the first vibrator, the following feature is employed to produce pseudo-sawtooth displacement vibration for causing the speed difference in an engagement section between the driving member and the driven member.

Specifically, in order to produce the pseudo-sawtooth displacement vibration, vibration at a fundamental frequency may be superimposed with at least harmonic vibration having a frequency two times as high as the fundamental frequency. In a conventional technique, the harmonic vibration is obtained by giving a rectangular-wave drive signal to a vibrator and setting a frequency of the drive signal to about 0.7 times as high as a resonance frequency of a vibration system. Differently, in this aspect, a shape of the first vibrator and the driving member is adjusted to allow the frequency of the second-order resonance mode to become approximately two times as high as the frequency of the first-order resonance mode, and the drive signal to be given from the drive circuit to the first vibrator is generated by superimposing at least two components approximately conforming to respective ones of the frequencies of the two resonance modes.

Thus, the drive device configured as above can be used in a resonance state, so that the displacement vibration can be multiplied by an amplitude amplification factor Q to improve a movement speed thereof, and allow a larger part of input energy to be used for mechanical vibration, so as to improve energy efficiency. Therefore, the drive device can be reduced in size or increased in torque, so that it can also be used for new purposes.

According to another aspect, in the above-described drive device, the driving member has a rod-like shape, wherein a portion of the driving member in a predetermined range from one end thereof on a side opposite to the first vibrator is formed to be reduced in diameter so as to lower a mechanical impedance, whereby the frequency of the second-order resonance mode is set to approximately two times as high as that of the first-order resonance mode.

According to this feature, based on a phenomenon that a resonance frequency of the rod-shaped driving member is increased by shaving a portion of the rod-shaped driving member corresponding to a vibration antinode (by lowering a mechanical impedance), a portion of the driving member in a predetermined range which corresponds to a vibration antinode in the first-order resonance mode and corresponds to a vibration antinode and a vibration node in the second-order resonance mode is formed to be reduced in diameter, for example, by cutting or grinding.

This makes it possible to increase the first-order resonance frequency, while maintaining the second-order resonance frequency, so as to allow a frequency ratio between the two resonance modes to become approximately 2, thereby efficiently producing the pseudo-sawtooth displacement vibration. Alternatively, the mechanical impedance may be lowered by changing a material of the driving member from an axially intermediate position thereof.

According to another aspect, in the above-described drive device, the driving member has a rod-like shape, wherein an outer peripheral surface of the driving member at least in the predetermined range is formed as a continuous curved surface. In other words, the diameter of the driving member is smoothly (continuously) changed in an axial direction thereof.

According to this feature, the driving member is formed in an optimal shape capable of providing the resonance frequency ratio 2, and eliminating a stepped portion. Thus, it becomes possible to avoid stress concentration to improve reliability.

According to another aspect, in the above-described drive devices, the drive circuit in the above drive device is provided with an H-bridge circuit, and operable to generate a rectangular wave or a three-level stepped wave.

According to this feature, the drive circuit has the H-bridge circuit, wherein the first vibrator may be provided to couple respective midpoints of the H-bridge. In this case, it becomes possible to apply thereto a voltage 2V which is two times as high as a power supply voltage V applied between opposite terminals of the H-bridge Thus, the drive device configured as above can obtain a large vibration amplitude.

According to another aspect, there is provided a drive device which comprises: a first vibrator adapted to be vibrated in a predetermined direction as a vibration direction; a second vibrator provided on the side of one end of the first vibrator in the vibration direction and adapted to be displaceably driven in the vibration direction by the first vibrator, and further vibrated in the predetermined direction, independently; a driven member engaged with the second vibrator or a driving member coupled to the second vibrator, with a predetermined frictional force; and a drive circuit for giving drive signals to the first and second vibrators, respectively, to vibrate the first and second vibrators, wherein: the first and second vibrators are formed to have two resonance modes in a vibration system, respectively, and allow a ratio between respective frequencies of the resonance modes in the first and second vibrators to become approximately 2; and the drive circuit is operable to generate two signals each having a component approximately conforming to a respective one of the frequencies in the first-order and second-order resonance modes having the approximately one-to-two relation, and give the signals to respective ones of the first and second vibrators as the drive signals, thereby producing resonantly-amplified pseudo-sawtooth displacement vibration in an engagement section between the second vibrator or the driving member, and the driven member, to move the driven member in the vibration direction.

In the aspect, in a drive device realized as an ultrasonic linear actuator, the two vibrators each composed, for example, of a piezoelectric element, are provided such that the first vibrator is located on a fixed side, and the second vibrator is located on a driving side, wherein the driven member is engaged with the driving member with a predetermined frictional force. Then, the driven member is moved by producing a speed difference between during extending and during contracting of each of the first and second vibrators. Further, the first and second vibrators are formed to have two resonance modes in a vibration system, respectively, and allow a ratio between respective frequencies of the resonance modes in the first and second vibrators to become approximately 2, and each of the drive signals to be given from the drive circuit to the two vibrator is generated to have a component approximately conforming to a respective one of the frequencies in the two resonance modes.

Thus, the drive device configured as above can be used in a resonance state, so that the displacement vibration can be multiplied by an amplitude amplification factor Q to improve a movement speed thereof, and allow a larger part of input energy to be used for mechanical vibration, so as to improve energy efficiency. Therefore, the drive device can be reduced in size or increased in torque, so that it can also be used for new purposes.

According to another aspect, in the above-described drive device, the drive device using the two vibrators comprises a coupling member interposed between the first vibrator and the second vibrator. The coupling member has a shank and a head having a diameter greater than that of the shank, and the shank has a distal end fixedly attached to the one end of the first vibrator. Further, the second vibrator is formed in a tubular shape to insertingly receive the coupling member, and fixedly attached to the head of the coupling member at a midpoint thereof in the vibration direction, and the engagement section with respect to the driven member is provided on the side of an end of the second vibrator opposite to the first vibrator.

According to another aspect, in the above-described drive device, the drive device using the two vibrators comprises a coupling member interposed between the first vibrator and the second vibrator. The coupling member is formed to have a diameter greater than the first vibrator and fixedly attached to the one end of the first vibrator. Further, the second vibrator is formed in a tubular shape to insertingly receive the coupling member and the first vibrator, and fixedly attached to an outer peripheral edge of the coupling member at a midpoint thereof in the vibration direction, and the engagement section with respect to the driven member is provided on the side of an end of the second vibrator opposite to the first vibrator.

According to another aspect, there is provided a drive device using the two vibrators, preferably, which comprises: a first vibrator adapted to be vibrated in a predetermined direction as a vibration direction; a first driving member provided on the side of one end of the first vibrator in the vibration direction; a second driving member engaged with the first driving member with a predetermined frictional force; a second vibrator provided to the second driving member and adapted to be vibrated in the same direction as that of the first vibrator; and a drive circuit for giving drive signals to the first and second vibrators, respectively, to vibrate the first and second vibrators, wherein: the first and second vibrators are formed to have two resonance modes in a vibration system, respectively, and allow a ratio between respective frequencies of the resonance modes in the first and second vibrators to become approximately 2; and the drive circuit is operable to generate two signals each having a component approximately conforming to a respective one of the frequencies in the first-order and second-order resonance modes having the approximately one-to-two relation, and give the signals to respective ones of the first and second vibrators as the drive signals, thereby producing resonantly-amplified pseudo-sawtooth displacement vibration in an engagement section between the first driving member and the second driving member, to cause a relative movement between a set of the first vibrator and the first driving member and a set of the second vibrator and the second driving member, in the vibration direction.

According to another aspect, in the above-described drive device, the drive device comprises two vibration transmission members each fixedly attached to a respective one of opposite end faces of the second vibrator. Each of the vibration transmission members is formed in a tubular shape to have approximately the same diameter. One of the vibration transmission members is interposed between the driving member and the second vibrator.

According to another aspect, in the above-described drive device, the other end of the first vibrator in the vibration direction is fixed to a fixed object.

According to this feature, in the drive device where the driving member, the coupling member and the second vibrator are formed to extend from the first vibrator, one end of the first vibrator in the vibration direction is fixed to the fixed object, and the other end is connected to the driving member, the coupling member and the second vibrator. In other words, as a support member for the drive device, a fixed object is used which is made of a material having a high density and a high elastic modulus and formed to have a sufficiently large weight.

Thus, the drive device configured as above can eliminate a need for providing an additional set of the drive device, to allow vibration generated in the first vibrator to be propagated toward the driving member and the coupling member, thereby downsizing the configuration.

According to another aspect, in the above-described drive devices, the driven member comprises a rotor having an outer peripheral surface constituting the engagement section, and an output take-out shaft serving as a rotary shaft of the rotor.

According to this feature, a displacement of the driving member in the vibration direction, i.e., a linear displacement, can be taken out in the form of a rotational displacement.

According to another aspect, in the above-described drive devices, the first vibrator is a piezoelectric element which has an amplitude amplification factor (Q) of 100 or more.

This application is based on Japanese Patent Application Serial No. 2010-23394 filed in Japan Patent Office on Feb. 4, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

The present invention can provide a drive device.

What is claimed is:

1. A drive device comprising:
a first vibrator adapted to be vibrated in a predetermined direction as a vibration direction;
a second vibrator provided on the side of one end of the first vibrator in the vibration direction and adapted to be displaceably driven in the vibration direction by the first vibrator, and further vibrated in the predetermined direction, independently;
a driven member engaged with the second vibrator or a driving member coupled to the second vibrator, with a predetermined frictional force;
a drive circuit for giving drive signals to the first and second vibrators, respectively, to vibrate the first and second vibrators; and
a coupling member interposed between the first vibrator and the second vibrator, the coupling member having a shank and a head having a diameter greater than that of the shank, the shank having a distal end fixedly attached to the one end of the first vibrator, wherein the second vibrator is formed in a tubular shape to insertingly receive the coupling member, and fixedly attached to the head of the coupling member at a midpoint thereof in the vibration direction, and the engagement section with respect to the driven member is provided on the side of an end of the second vibrator opposite to the first vibrator;
wherein:
the first and second vibrators are formed to have two resonance modes in a vibration system, respectively, and allow a ratio between respective frequencies of the resonance modes in the first and second vibrators to become approximately 2; and
the drive circuit is operable to generate two signals each having a component approximately conforming to a respective one of the frequencies in the first-order and second-order resonance modes having the approximately one-to-two relation, and give the signals to respective ones of the first and second vibrators as the drive signals, thereby producing resonantly-amplified pseudo-sawtooth displacement vibration in an engagement section between the second vibrator or the driving member, and the driven member, to move the driven member in the vibration direction.

2. The drive device according to claim 1, wherein the other end of the first vibrator in the vibration direction is fixed to a fixed object.

3. The drive device according to claim 1, wherein the driven member comprises a rotor having an outer peripheral surface constituting the engagement section, and an output take-out shaft serving as a rotary shaft of the rotor.

4. The drive device according to claim 1, wherein the first vibrator is a piezoelectric element which has an amplitude amplification factor (Q) of 100 or more.

5. The drive device according to claim 1, wherein the other end of the first vibrator in the vibration direction is fixed to a fixed object.

6. The drive device according to claim 1, wherein the driven member comprises a rotor having an outer peripheral surface constituting the engagement section, and an output take-out shaft serving as a rotary shaft of the rotor.

7. The drive device according to claim 1, wherein the first vibrator is a piezoelectric element which has an amplitude amplification factor (Q) of 100 or more.

8. A drive device comprising:
a first vibrator adapted to be vibrated in a predetermined direction as a vibration direction;
a first driving member provided on the side of one end of the first vibrator in the vibration direction;
a second driving member engaged with the first driving member with a predetermined frictional force;
a second vibrator provided to the second driving member and adapted to be vibrated in the same direction as that of the first vibrator; and
a drive circuit for giving drive signals to the first and second vibrators, respectively, to vibrate the first and second vibrators,
wherein:
the first and second vibrators are formed to have two resonance modes in a vibration system, respectively, and allow a ratio between respective frequencies of the resonance modes in the first and second vibrators to become approximately 2; and the drive circuit is operable to generate two signals each having a component approximately conforming to a respective one of the frequencies in the first-order and second-order resonance modes having the approximately one-to-two relation, and give the signals to respective ones of the first and second vibrators as the drive signals, thereby producing resonantly-amplified pseudo-sawtooth displacement vibration in an engagement section between the first driving member and the second driving member, to cause a relative movement between a set of the first vibrator and the first driving member and a set of the second vibrator and the second driving member, in the vibration direction.

9. The drive device according to claim 8, which comprises two vibration transmission members each fixedly attached to a respective one of opposite end faces of the second vibrator, each of the vibration transmission members being formed in a tubular shape to have approximately the same diameter, one of the vibration transmission members being interposed between the second driving member and the second vibrator.

10. The drive device according to claim 8, wherein the other end of the first vibrator in the vibration direction is fixed to a fixed object.

11. The drive device according to claim 8, wherein the driven member comprises a rotor having an outer peripheral surface constituting the engagement section, and an output take-out shaft serving as a rotary shaft of the rotor.

12. The drive device according to claim 8, wherein the first vibrator is a piezoelectric element which has an amplitude amplification factor (Q) of 100 or more.

13. A drive device comprising:

a first vibrator adapted to be vibrated in a predetermined direction as a vibration direction;

a second vibrator provided on the side of one end of the first vibrator in the vibration direction and adapted to be displaceably driven in the vibration direction by the first vibrator, and further vibrated in the predetermined direction, independently;

a driven member engaged with the second vibrator or a driving member coupled to the second vibrator, with a predetermined frictional force;

a drive circuit for giving drive signals to the first and second vibrators, respectively, to vibrate the first and second vibrators; and a coupling member interposed between the first vibrator and the second vibrator, the coupling member being formed to have a diameter greater than the first vibrator and fixedly attached to the one end of the first vibrator, wherein the second vibrator is formed in a tubular shape to insertingly receive the coupling member and the first vibrator, and fixedly attached to an outer peripheral edge of the coupling member at a midpoint thereof in the vibration direction, and the engagement section with respect to the driven member is provided on the side of an end of the second vibrator opposite to the first vibrator wherein:

the first and second vibrators are formed to have two resonance modes in a vibration system, respectively, and allow a ratio between respective frequencies of the resonance modes in the first and second vibrators to become approximately 2; and the drive circuit is operable to generate two signals each having a component approximately conforming to a respective one of the frequencies in the first-order and second-order resonance modes having the approximately one-to-two relation, and give the signals to respective ones of the first and second vibrators as the drive signals, thereby producing resonantly-amplified pseudo-sawtooth displacement vibration in an engagement section between the second vibrator or the driving member, and the driven member, to move the driven member in the vibration direction.

* * * * *